Aug. 1, 1967  R. HERMAN  3,333,915

SELF-THREADING MOTION PICTURE PROJECTOR

Filed Oct. 1, 1964  9 Sheets-Sheet 1

INVENTOR.
RAYMOND HERMAN
BY
Albert M. Parker
ATTORNEY

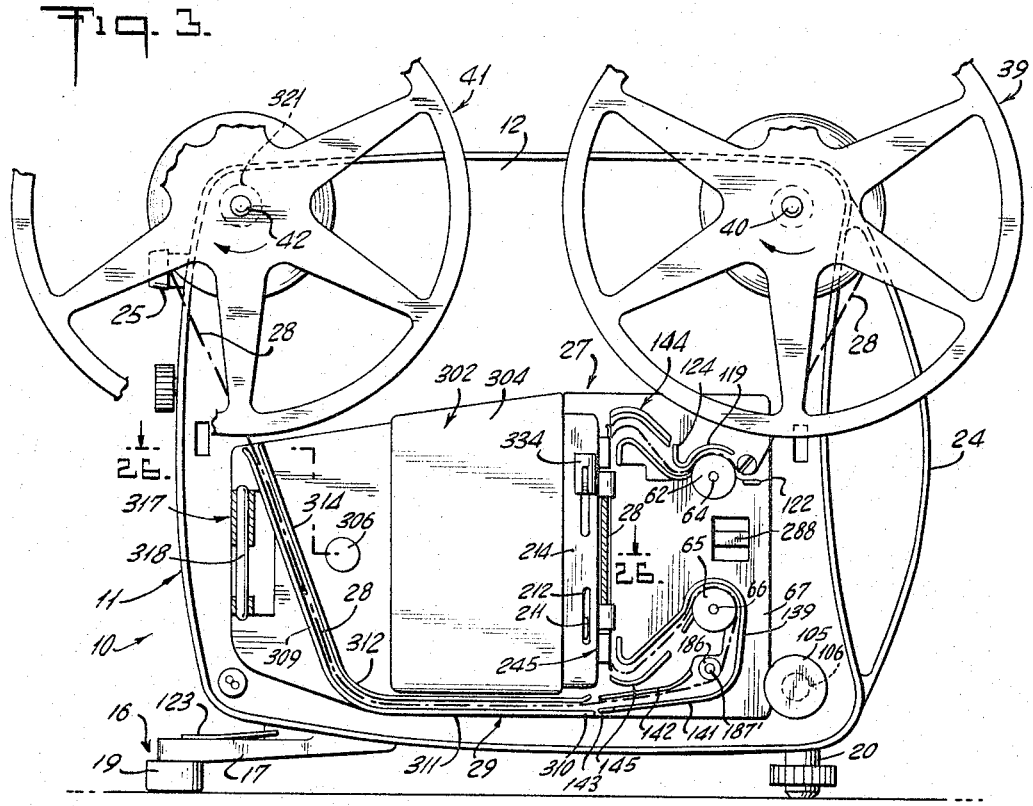
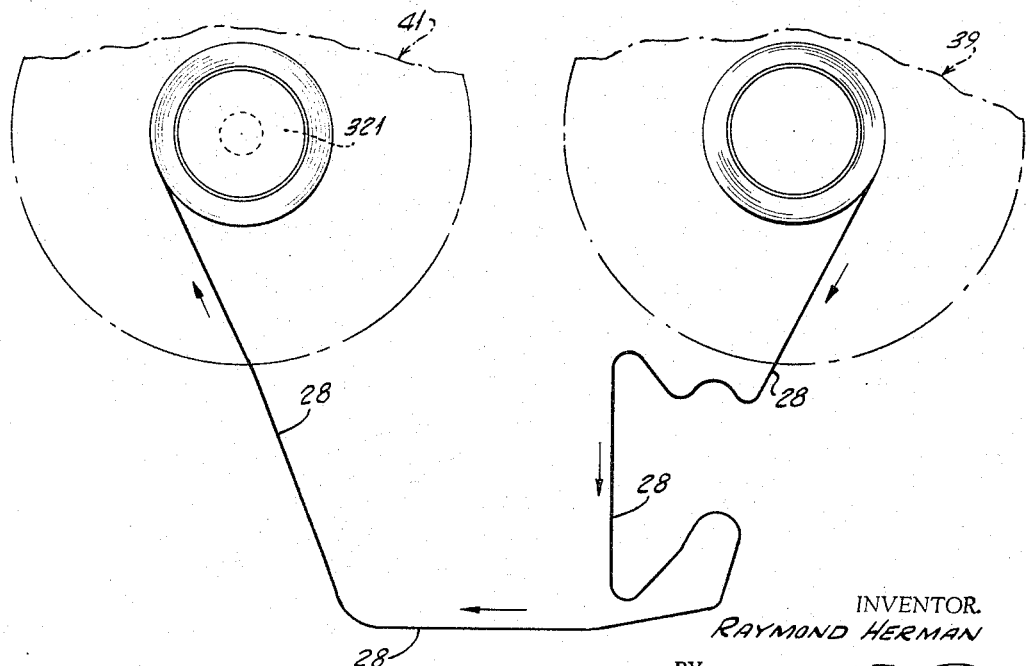

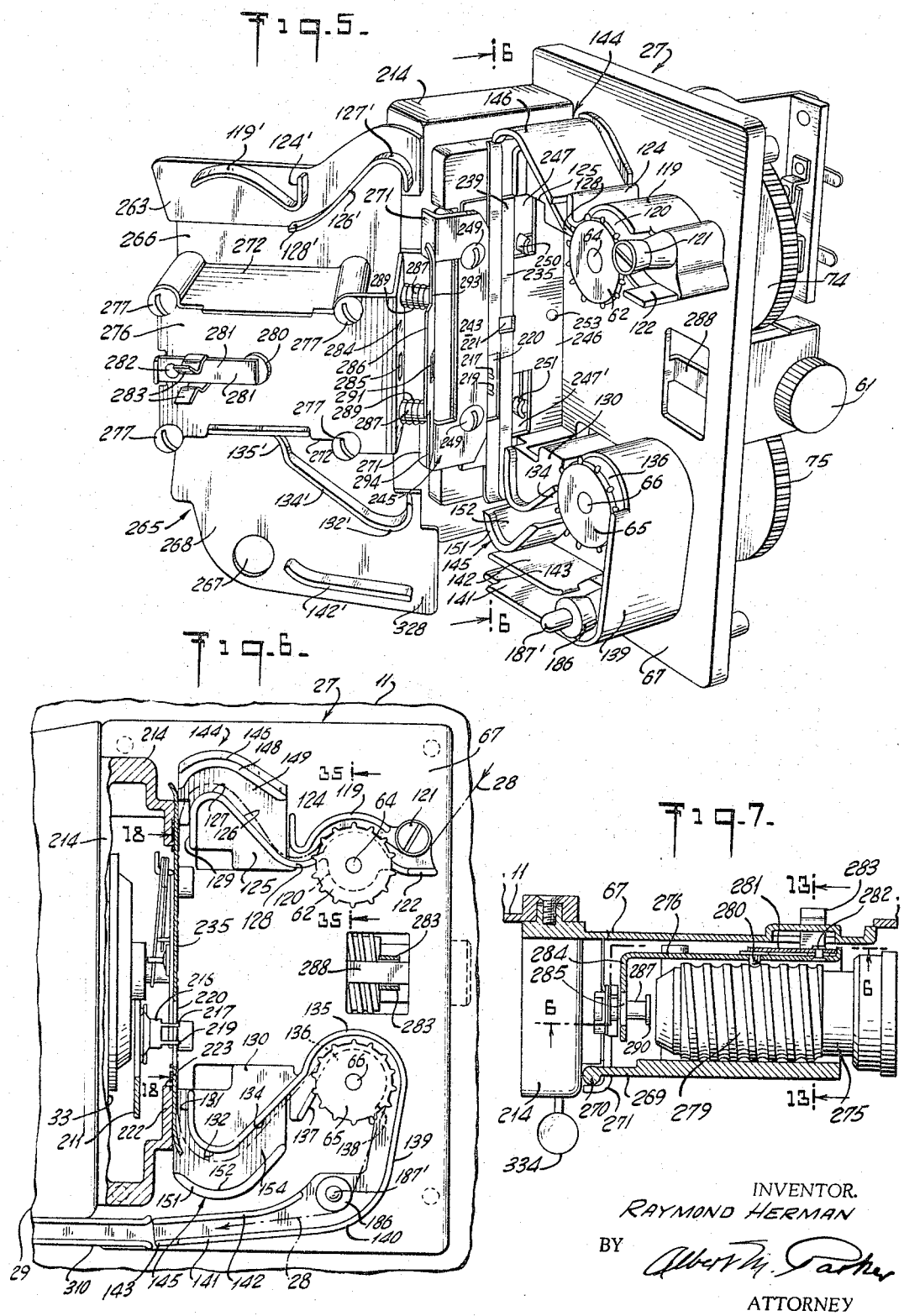

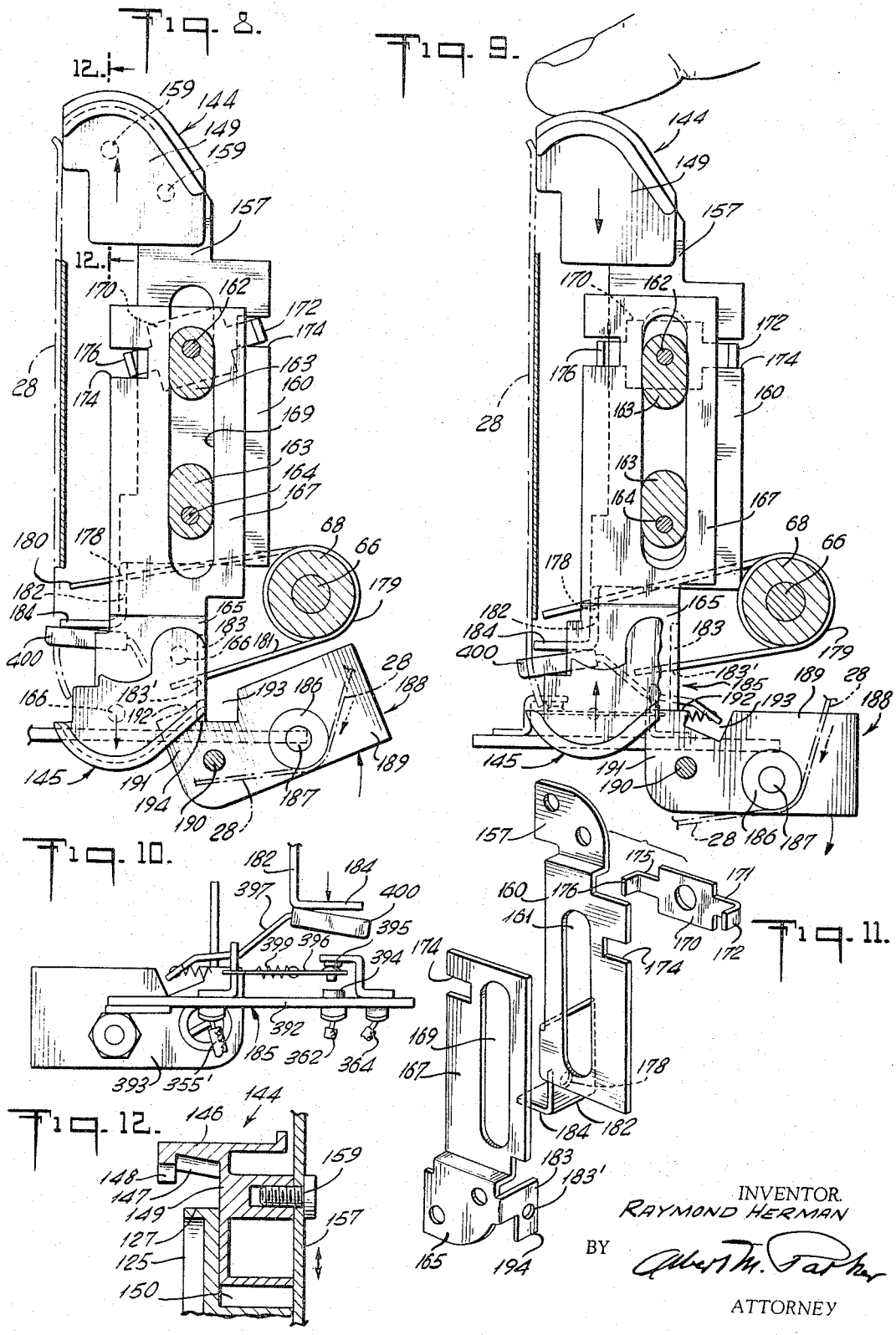

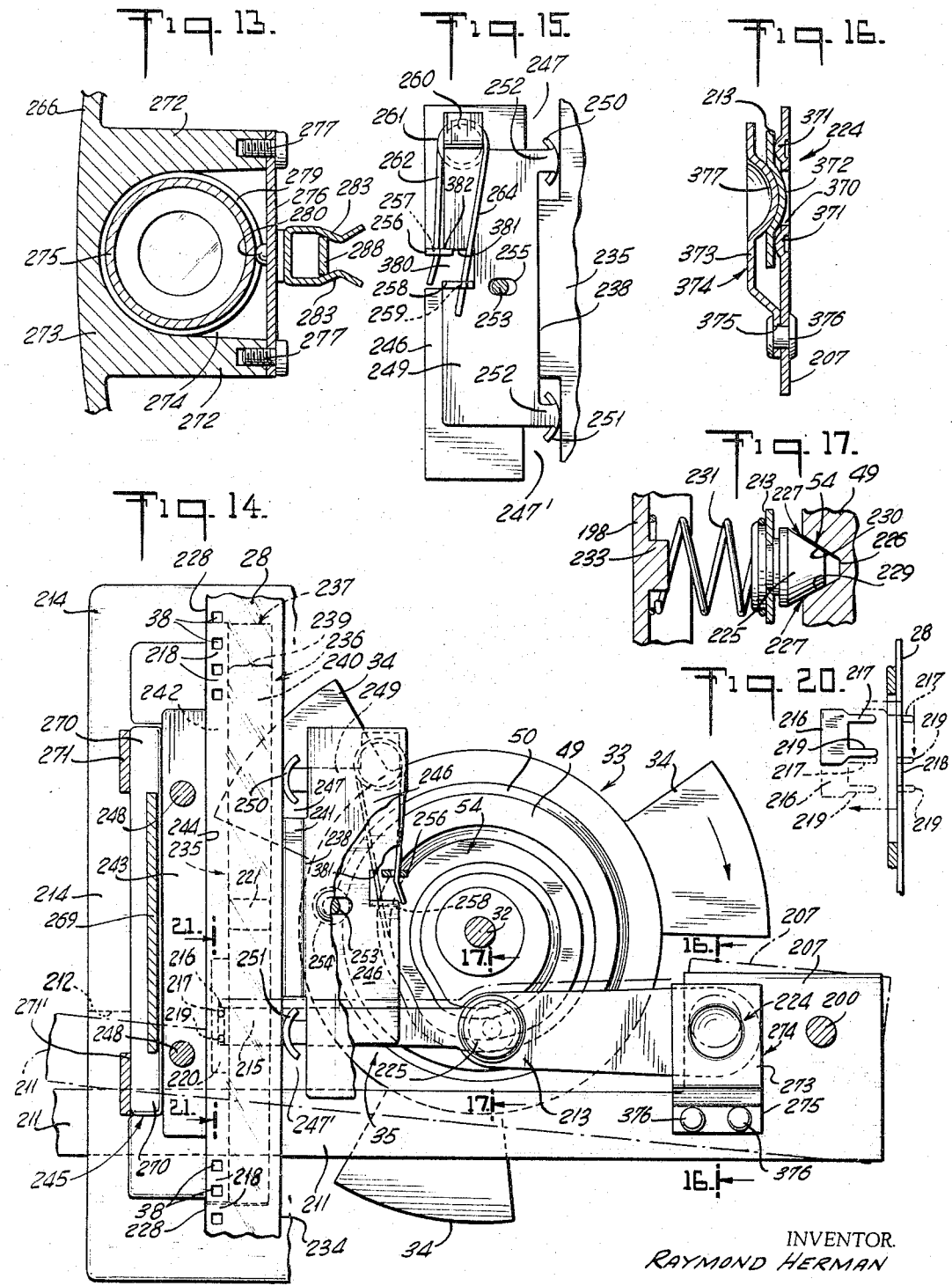

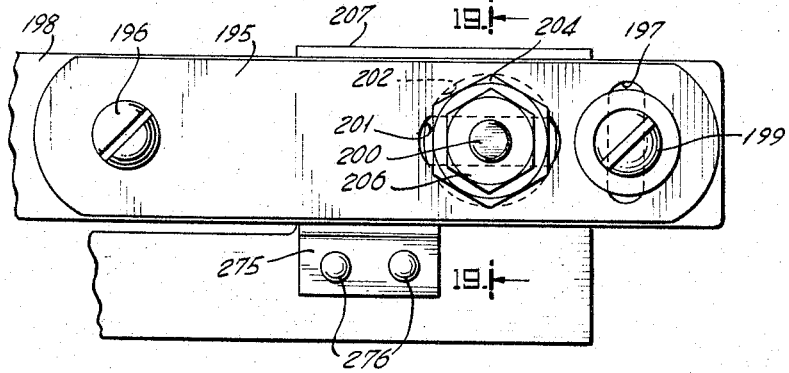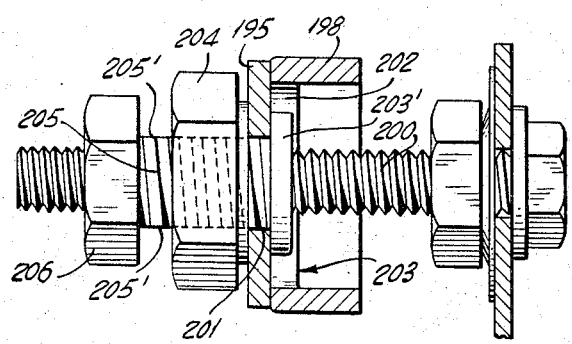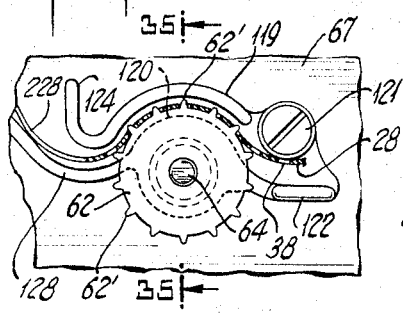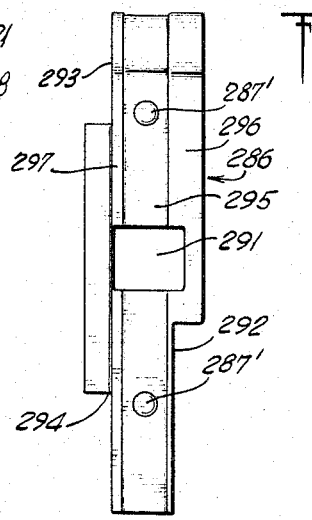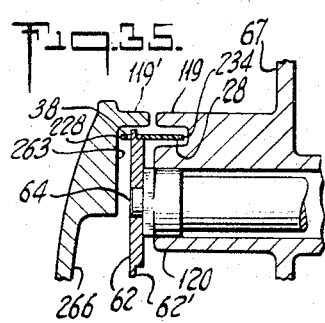
INVENTOR.
RAYMOND HERMAN
BY Albert M. Parker
ATTORNEY Aug. 1, 1967  R. HERMAN  3,333,915
SELF-THREADING MOTION PICTURE PROJECTOR
Filed Oct. 1, 1964  9 Sheets-Sheet 7
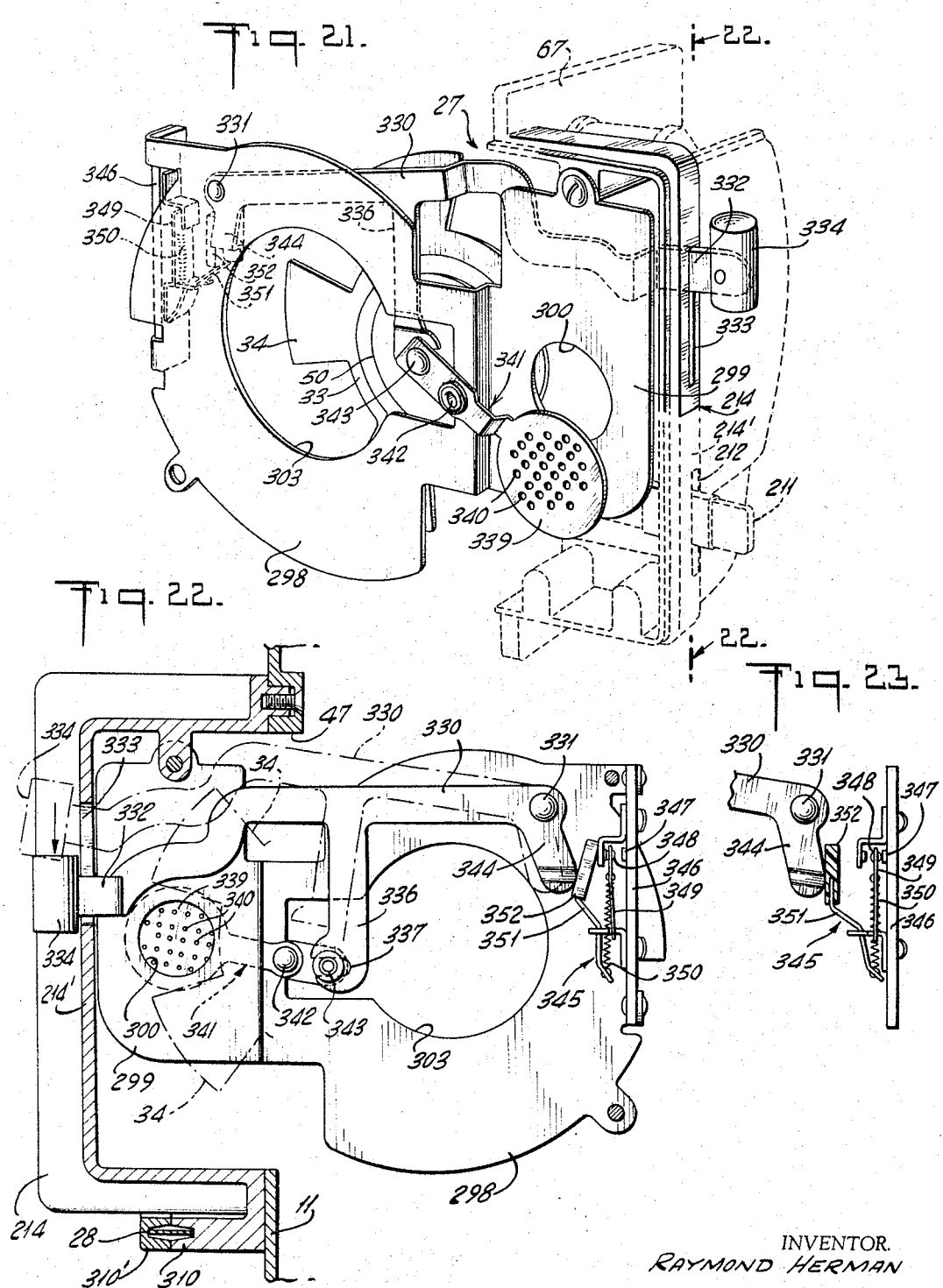
INVENTOR.
RAYMOND HERMAN
BY Albert M. Parker
ATTORNEY

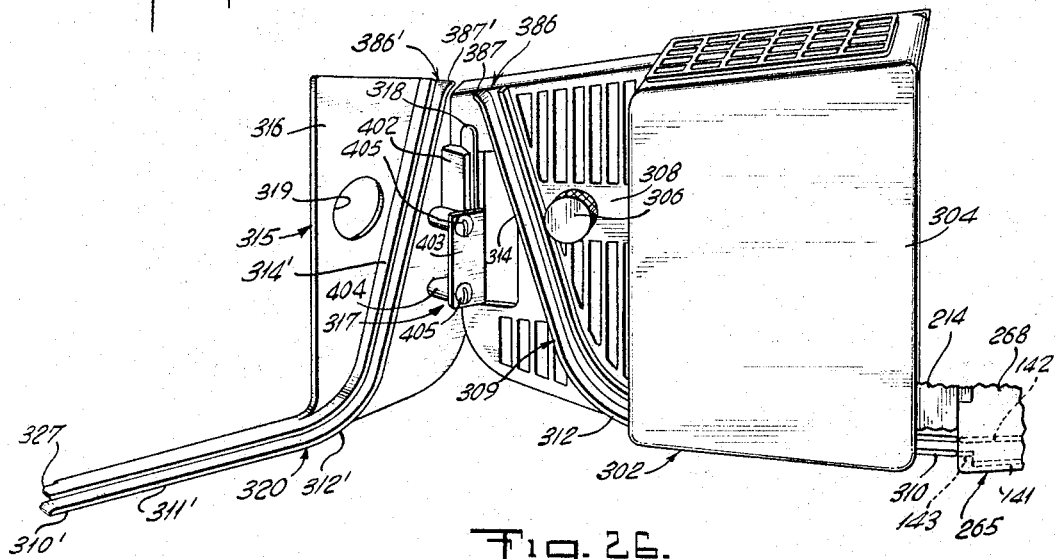
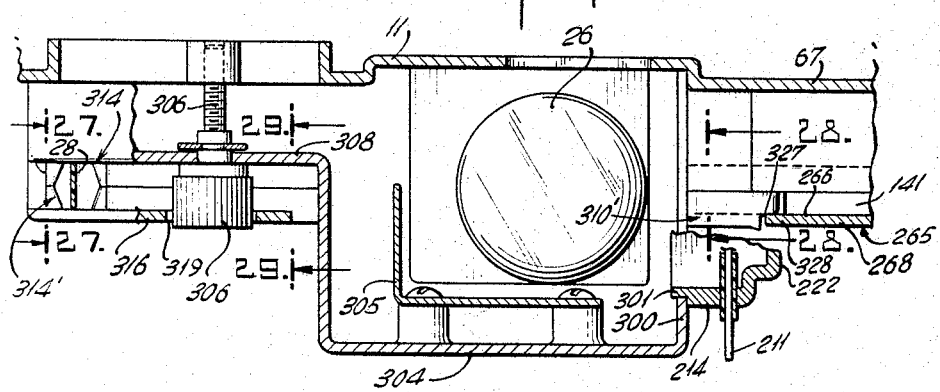
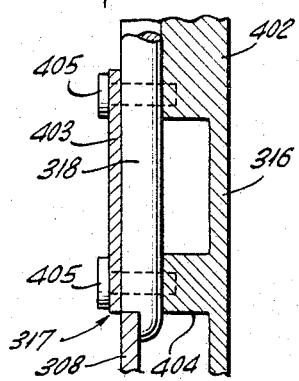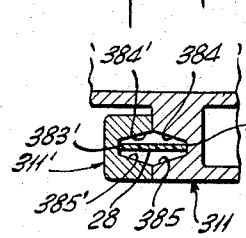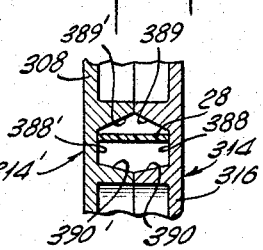

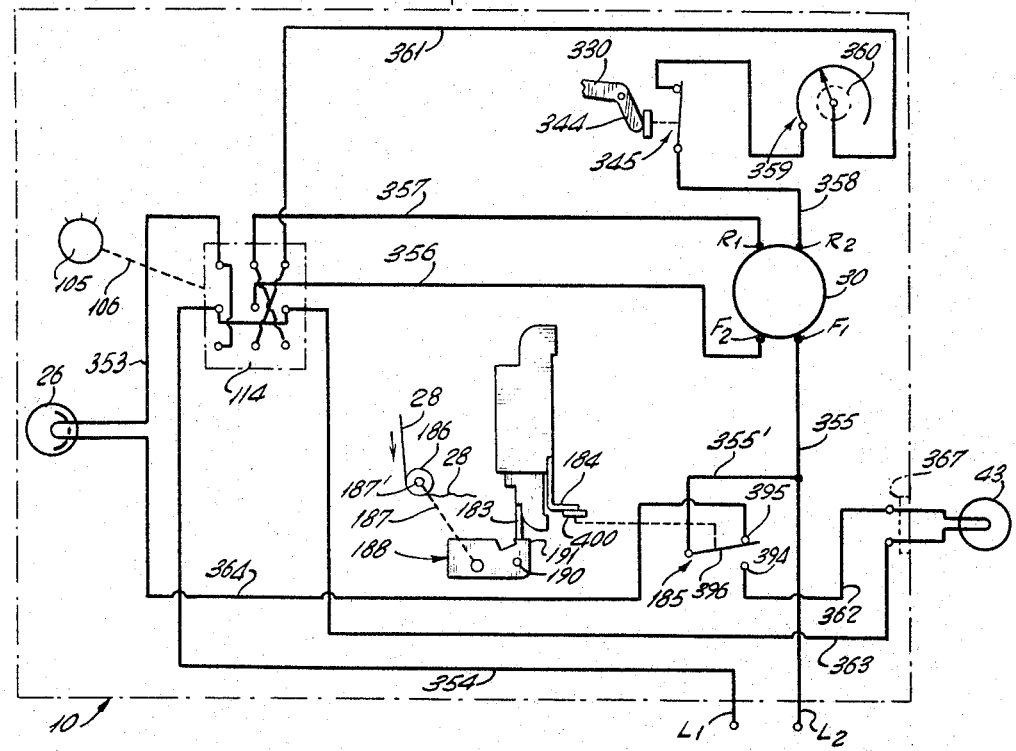
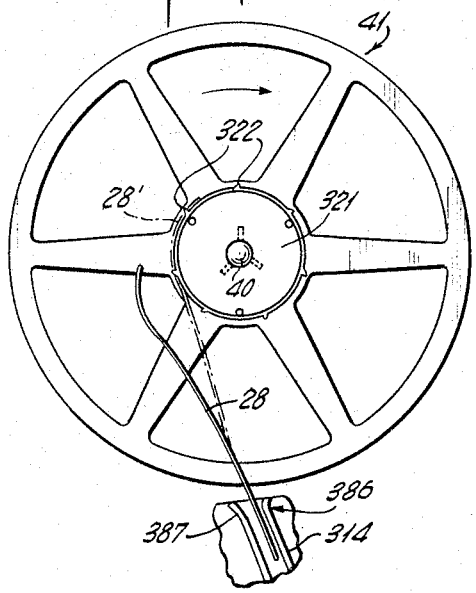
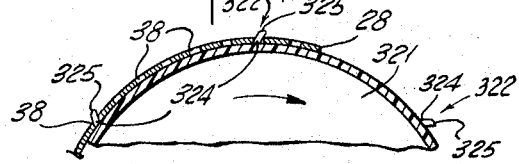
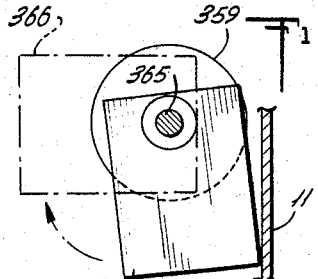

United States Patent Office 3,333,915
Patented Aug. 1, 1967

3,333,915
SELF-THREADING MOTION PICTURE PROJECTOR
Raymond Herman, North Bellmore, N.Y., assignor to Richmond Research Corporation, Richmond Hill, N.Y., a corporation of New York
Filed Oct. 1, 1964, Ser. No. 400,704
12 Claims. (Cl. 352—159)

ABSTRACT OF THE DISCLOSURE

Means for guiding film strip through a motion picture projector. The film strip guide means includes means forming a longitudinally divided strip receiving channel, said last named means including a first means fixedly connected to a fixed supporting part of the projector and bearing a first, laterally open side portion of the channel, and a second means bearing a laterally outwardly closed portion of the channel. The second means is removably connected to the fixed part of the projector and is releasably secured in closed position relative thereto so as to permit the channel selectively to be opened for film strip inspection and removal and to be held stably closed during the operation of the projector.

---

This invention relates to motion picture apparatus, although in certain aspects it relates more broadly to apparatus for and methods of handling elongated flexible strips of material such as film strips. The apparatus shown herein is a motion picture projector, with which some features of the invention display perhaps their greatest advantages.

It is to be understood, however, that in certain broader aspects of the invention, as will be apparent from the following description and claims, the invention is not limited to motion picture apparatus or motion picture projectors. Some of the various features of the invention may be used to advantage in the handling of flat strip material such as recording tape, for example, in strip material processing apparatus, and in the handling of notched or perforated strip material such as motion picture film in motion picture cameras and other film processing apparatus, as well as in motion picture projectors.

The invention has among its objects the provision of a novel apparatus and method of handling flexible strip material whereby the material is automatically taken up after it has passed through a strip processing apparatus.

A further object of the invention, particularly relating to the projector aspects thereof, lies in the provision of an improved lamp housing member and a novel lens mounting member, such members and parts thereof having an improved novel cooperation therebetween.

Another object of the invention lines in the provision of a novel simplified latch for the lens housing or mounting member of motion picture apparatus.

Still another object of the invention lies in the provision, in a strip handling apparatus, of improved strip guiding and feeding mechanism both in advance of and following the strip processing portion of such apparatus.

Still further objects of the invention lie in the provision, in motion picture apparatus, of improved loop-forming members positioned in advance of and beyond the film frame projecting gate, and the further provision of a novel combination wherein said loop formers further cooperate in a novel manner with the film traversing means of the apparatus so as to make the threading and taking up of the film from the film processing apparatus entirely automatic.

Yet another object of the invention resides in the provision of improved film guiding means at the gate of motion picture apparatus, whereby accurately to position a film strip laterally in its travel through the gate.

Still another object of the invention lies in the provision of an improved simplified mechanism at the gate of apparatus of the type indicated whereby to advance the film strip intermittently through said gate, said film advancing means being particularly characterized by its simplicity and the ease with which it may be adjusted, when necessary, in order properly to position the film strip in a longitudinal direction.

Yet a further object of the invention lies in the provision of a novel control system for the projector lamp of the projector, said system automatically turning the projector lamp on when the film strip has been completely threaded through the projector.

A still further object of the invention lies in the provision of an automatic control system for a room illuminating lamp which may be employed in conjunction with the projector, said system automatically turning off such room illuminating lamp after the projector has become fully threaded.

Another object of the invention lies in the provision of novel means which may, if desired, be employed with the illustrative projector of the invention so as selectively to project a single frame of a motion picture frame as a still picture.

A still further object of the invention lies in the provision of an improved and simplified driving and control system for a motion picture projector whereby the rate of film travel through the projector may be changed in speed and direction as desired.

The above and further objects and novel features of the invention will more fully appear from the following description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views:

FIG. 3 is a view of the projector disclosed similarly to FIG. 1 but with the film supply and take-up reels of the projector being shown mounted thereon, the projector lens mounting unit and a portion of the housing thereof rearwardly of the projector lamp housing having been removed by vertical section to show the path of the film through the projector;

FIG. 4 is a diagrammatic view of the film supply and take-up reels of the projector in their operative relative positions, the view showing the path of the film through the projector between such reels;

FIG. 5 is a view in perspective looking in the direction from front to rear of the film strip traversing and guiding unit of the projector, the lens mounting unit being shown swung to its fully opened position;

FIG. 6 is a fragmentary view partially in side elevation and partially in vertical section of the forward end of the projector at the location of the film traversing and guiding unit, the section being taken generally along the line 6—6 in each of FIGS. 5 and 7;

FIG. 7 is a view in horizontal axial section through the lens barrel mounting portion of the projector, certain of the parts being shown in plan, the section being taken along the line 7—7 of FIG. 1;

FIG. 8 is a somewhat simplified view partially in side elevation and partially in vertical section showing the loop-forming members of the projector associated with the film traversing mechanism at the projecting gate, the loop-forming members being shown in their outer, inactive positions;

FIG. 9 is a view similar to FIG. 8 but with the loop-forming members positioned inwardly so as actively to cooperate with the film strip initially passing through the projector so as to form loops therein during the threading of the projector;

FIG. 10 is a view in side elevation showing the projector lamp controlling switch which is associated with and operated by the loop forming members;

FIG. 11 is an exploded view in perspective of the means mounting the upper and lower loop-forming members and connecting them for equal movement in opposite directions;

FIG. 12 is a fragmentary view in vertical section through the upper loop-forming member, the member being shown in cooperation with a portion of the fixed structure of the projector which guides such member, the section being taken along the line 12—12 of FIG. 8;

FIG. 13 is a view in transverse section through the lens barrel and the lens barrel mounting means of the projector, the section being taken along the line 13—13 of FIG. 7;

FIG. 14 is a fragmentary view partially in end elevation and partially in vertical section through the projector immediately forward of the film-feeding gate thereof, the section being taken generally along the line 14—14 in FIG. 1;

FIG. 15 is a fragmentary view in rear elevation of a resiliently mounted film-guiding member at the film gate of the projector;

FIG. 16 is a fragmentary view in vertical section through the pivot-forming mounting means for the laterally outer end of the film traversing lever, the section being taken along the line 16—16 in FIG. 14;

FIG. 17 is a fragmentary view partially in vertical section and partially in side elevation of a portion of the cam and the cam follower means of the film traversing mechanism, the section being taken along the line 17—17 of FIG. 14;

FIG. 18 is a fragmentary view in end elevation of a portion of the film traversing mechanism and of the means supporting and adjusting such mechanism, the view being taken from the line 18—18 of FIG. 2 in the direction of the arrows;

FIG. 19 is a fragmentary view partially in vertical section through the portion of the film traversing mechanism and the means mounting and adjusting such mechanism shown in FIG. 18, the section being taken along the line 19—19 of FIG. 18;

FIG. 20 is a fragmentary somewhat schematic view partially in side elevation and partially in section illustrating the action of the film engaging portion of the film traversing mechanism;

FIG. 21 is a view in perspective looking in the forward direction showing the single-framing mechanism of the projector;

FIG. 22 is a view in transverse section through the projector immediately forward of the single framing mechanism thereof, the section being taken along the line 22—22 of FIG. 21, the single-framing mechanism being shown in solid lines in its operative position and in phantom lines in its inoperative position;

FIG. 23 is a fragmentary view partially in elevation and partially in vertical section through the motor controlling switch associated with the single framing mechanism, the portion of the operating lever of the mechanism shown being in its inoperative position and the switch being shown in its normally closed position;

FIG. 24 is a view in rear end elevation of the resiliently mounted presser plate which is mounted on the lens mounting unit and which overlies the film strip passing through the gate of the projector when the lens mounting unit is in its closed, operative position;

FIG. 25 is a view in perspective of the rear housing element of the projector which carries the lamp housing and the rear portion of the film guiding track leading to the take-up reel, the hingedly mounted member on such unit which carries a half-section of the film guiding track being shown swung to its fully opened position;

FIG. 26 is a view in horizontal section through the housing unit shown in FIGS. 25 but with the hingedly mounted member of such unit in closed, operative position, the section being taken along the broken section line 26—26 of FIG. 3;

FIG. 27 is a fragmentary view partially in vertical section and partially in side elevation of the hinge of the housing unit shown in FIGS. 25 and 26, the section being taken along the line 27—27 of FIG. 26;

FIG. 28 is a fragmentary view in vertical section through a portion of the closed film-guiding track in the forward portion thereof, the section being taken along the line 28—28 of FIG. 26;

FIG. 29 is a view in section transverse to the length of the film guiding track in the rear inclined portion thereof, the section being taken along the line 29—29 of FIG. 26;

FIG. 30 is a somewhat schematic wiring diagram for the control mechanism for the projector;

FIG. 31 is a schematic view in side elevation illustrating the action of the leading end of the film approaching the take-up reel;

FIG. 32 is a fragmentary view in vertical section through the hub of the take-up reel immediately following its gripping of the leading end of the film strip;

FIG. 33 is a fragmentary view in vertical section through the projector at the rear end thereof showing the stop means for the motor controlling rheostat, the section being taken along the line 33—33 of FIG. 2;

Figures 1, 2:
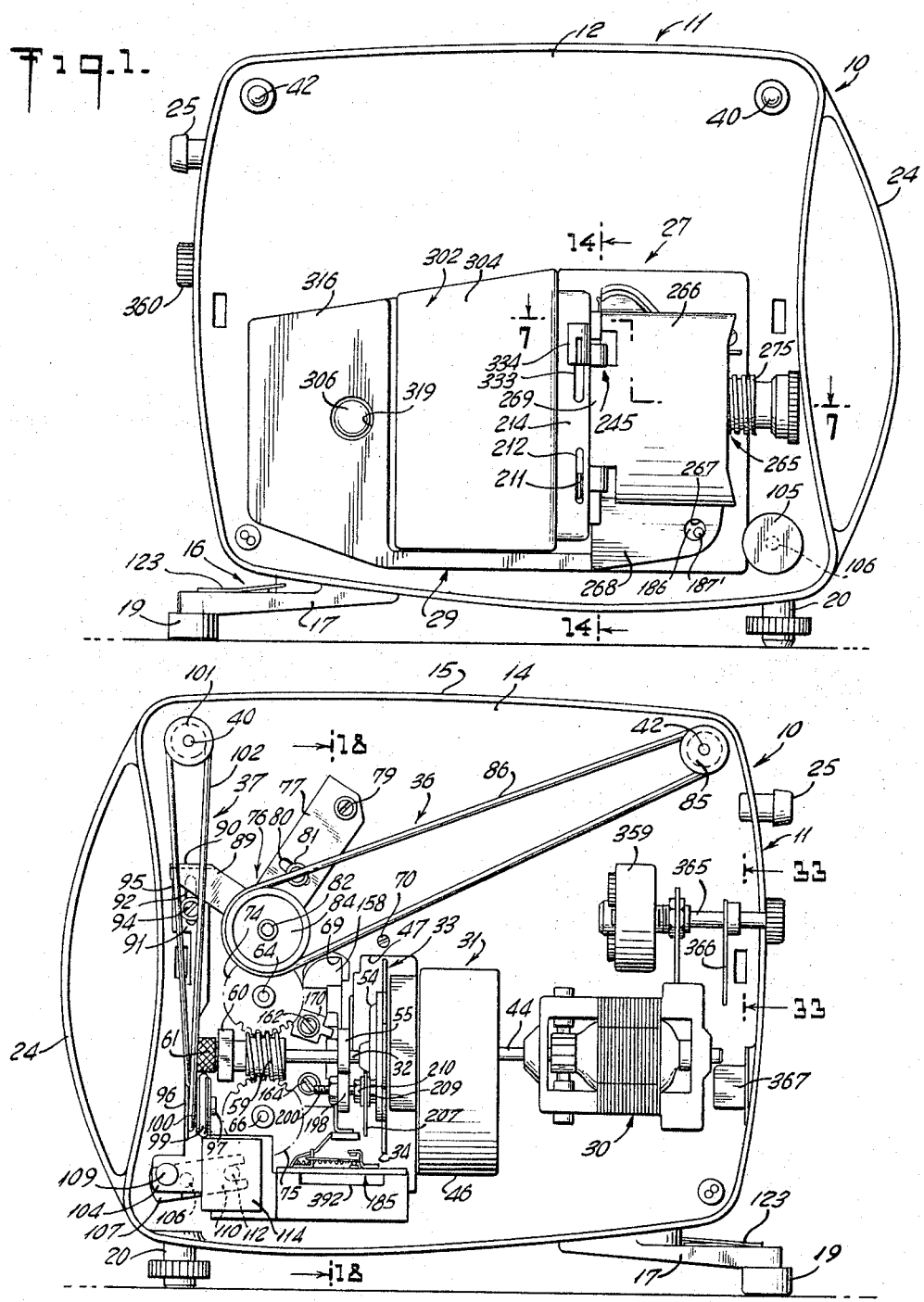
FIG. 1 is a view in side elevation of the projector in position for use, the side of the projector mounting the film-projecting and traversing mechanism facing the reader.
FIG. 2 is a view in side elevation of the other side of the projector, the normally employed cover for such side of the projector having been removed.

FIG. 34 is an enlarged fragmentary view in side elevation from the point of view of FIG. 6 of a portion of the projector at the location of and including the upper film feeding sprocket; and FIG. 35 is a fragmentary view in vertical axial section through the upper film feeding sprocket, the section being taken along the section line 35—35 in the direction of the arrows in both FIGS. 6 and 34 but with the lens barrel mounting member 265 in closed, operative position.

*General description*

The motion picture projector illustrated herein is generally designated by the reference character 10. Projector 10 has a main frame in the form of a vertically extending plate member 11, member 11 having a first, "outer" side 12 which is shallowly flanged and a second, "inner" side 14 which is provided with a rather deep peripheral flange 15. In its operative position shown in FIGS. 1 and 2, the projector rests upon a rear supporting means 16 which is secured, as by being bolted, to the flange 15. Support 16 is generally of broal V shape, and has oppositely inclined arms 17 on which are mounted feet 19 of rubber or the like. The forward end of the projector is adjustably supported on a single stud 20 screw threaded into flange 15, whereby the angle of the projector 10 with respect to the horizontal may be adjusted as required. The projector is adapted to be provided with a removable cover portion (not shown) adapted to be removably secured, as by latch means, to the side 12 of member 11, the cover being removed when the projector is to be used. A further cover portion (not shown) is provided for the side 14 of member 11; such latter cover portion is removable from but is ordinarily left attached to the projector except when the projector is being serviced. The forward end of the frame member 11 of the projector is provided with an arched member 24 spaced from the main portion of member 11 and functioning as a handle when the projector is carried with its normally forward portion at the top. When in such position, the projector is stably supported upon the rear edges of the resilient feet 19 and a further single resilient foot member 25 which is provided on the flange 15 at the rear of supporting plate 11 adjacent its normally upper end.

Mounted on the side 12 of the plate member 11 are a projector lamp 26, a film projector gate and traversing unit 27 forwardly of the projector lamp, and a member 29 rearwardly of the projector lamp. One portion of member 29 functions to house the projector lamp and another portion thereof contains a guide for the film strip 28 which has issued from the projector gate and is being forwarded to the take-up reel 41 at the rear upper corner of frame member 11. The main driving mechanism for advancing the film through the projector, for selectively taking it up or rewinding it, for cooling the projector lamp, and so forth are mounted on side 14 of the frame member 11.

The driving means for the projector is generally the same as that shown and described in applicant's prior Patent No. 3,074,662 dated Jan. 22, 1963. Such driving means in the embodiment shown includes a variable speed reversible electric motor 30. Motor 30 drives a fan 31 for cooling the projector lamp, and further drives through a pulley and belt arrangement, to be described, a forward shaft 32 through which the supply or pay-off reel 39 and the film take-up reel 41 are selectively driven. On the rear end of shaft 32 there is mounted a rotatable shutter or chopper wheel 33 having angularly spaced blades 34, a film traverse mechanism generally designated 35 by which the film is fed intermittently through the projecting gate is driven by cam means, to be described, including a cam track 227 which is formed in a cam integral with the hub of the wheel 33. Also mounted on side 14 of plate 11 is a selectively operated driving means 36 by which the film is taken up after its projection, and a further selectively operated driving means 37 whereby the film may be fed in a reverse direction so as to be projected in a reverse direction, when desired, or rewound.

*General operation*

The projector is provided adjacent its normally upper forward corner (FIGS. 1, 2, and 3) with a shaft 40 which projects through the frame member 11 and outwardly of side 12 thereof, shaft 40 providing support for and drivingly engaging the film supply reel 39. Adjacent the rear upper corner of frame member 11 there is provided a similar shaft 42 which supports and has driving engagement with the film take-up reel 41. In the projector shown, a reel 39 of the film to be projected is mounted upon shaft 40 in the manner shown in FIG. 3, the forward end of such film being led from reel 39 and inserted in the outer, entrance end of a film guiding channel provided by the means 121 and 122, to be described. With the motor 30 energized and the mechanism 36 driven in the "forward" direction, the leading end of the film strip 28 is engaged by a first feeding sprocket 62 which forwards it at constant speed to a first, upper loop former 144, thence to a film projecting gate wherein it is fed forward intermittently. From the gate the film travels to a second, lower loop-forming means 145 and then to a second film feeding sprocket 65 which forwards it at the same constant speed as sprocket 62. From the second constant speed sprocket 65 the film is thrust downwardly and then rearwardly through a normally closed channel extending parallel to plate member 11 and then is diverted so that it emerges from the film guiding channel and passes upwardly along a path of travel which extends upwardly toward the take-up reel. The projection of the film guiding channel passes somewhat to the rear of the shaft 42 of the take-up reel 41.

Because of the manner in which the film had been coiled upon the supply reel 39, the film upon emerging from the guide channel has an inherent tendency to curl forwardly. Thus the leading end of the film automatically comes into contact with the hub of the take-up reel 41 in the manner shown in FIG. 31. The hub of the take-up reel is provided with film gripping members, such as hooks with forwardly free end portions engageable within the sprocket holes 38 of the film. The shaft 42 and the take-up reel 41 mounted thereon have an unloaded driven speed which somewhat exceeds the speed to which the film strip 28 is forwarded to the take-up reel by sprocket 65.

Thus when the forward end of the film strip 28 is grasped by the gripping means on the take-up reel, the run of the film between the second constant speed feeding sprocket 65 therefor and the take-up reel 41 is subjected to appreciable tension which, however, does not damage the film, since the drive to the take-up reel is frictional and impositive. Such tensioning of the leading end portion of the film strip, and the resulting change in the path of such portion of the strip within the guiding means therefor beyond sprocket 65 are employed automatically to retract the upper and lower loop-forming members from contact with the film strip, to turn on the projector lamp 26 which until that time has remained unenergized, and, if desired, to extinguish or de-energize a room illuminating lamp 43 which, in the embodiment of projector shown, is selectively energized through circuit means provided in the projector. Such circuit means is shown in FIG. 30.

*The drive mechanism*

The motor 30 of the projector 10 is secured to plate 11 on side 14 thereof (FIG. 2). Motor 30 has a forwardly projecting shaft 44 upon which a bladed rotor (not shown) for the projector lamp-cooling fan 31 is fixedly mounted. The casing 46 of the fan is secured by suitable brackets, not specifically shown, upon plate 11 on the side 14 thereof. The plate 11 has a window or opening therethrough, as shown at the top in FIG. 26; the outlet of the casing 46 of the fan 31 directly communicates with the interior of the housing for the projector lamp 26 through the rear end portion 47 of such opening (FIG. 2). Beyond the fan 31 the motor shaft 44 is provided with a first, smaller, pulley, such pulley driving a larger pulley 50 which is mounted on the rear end of shaft 32. Pulley 50 is formed as a portion of the hub 49 of the shutter wheel 33 (FIG. 14). The small pulley on shaft 44 and the larger pulley 50 are connected by a belt, not specifically shown, the described arrangement providing for a speed reduction between shafts 44 and 32.

The shutter 33 (FIG. 14) has a plurality of radially directed blades 34 (three shown) which in their rotation successively interrupt the light from the projector lamp 26 in its travel to the film projecting gate, whereby to permit intermittent advance of the film at such gate in a manner undetected by the eye. The hub 49 of the shutter wheel 33 also includes in its forward surface a cam 54 for driving the means, to be described, for intermittently feeding the film through the gate. Projecting outwardly from the side 14 of member 11 is a supporting arm member 198 (FIG. 2) which provides support at its outer end for the intermittent film advancing mechanism, to be described, and at its root mounts a rear bearing 55 for shaft 32.

Fixedly mounted upon shaft 32 is a worm gear 59 which drives the means for constantly feeding the film strip into and out of the loops in advance of and beyond the projecting gate. A forward bearing 60 for shaft 32 is supported in a pillow block which projects laterally from side 14 of frame member 11. Beyond such forward bearing and bearing support, the shaft 32 is provided with a knurled wheel 61 by means of which the film rewinding mechanism is selectively driven in a manner to be described.

The means feeding the film strip 28 at constant speed to the first or upper loop in advance of the projector gate (FIGS. 3, 5, and 6) includes the first, upper sprocket 62, which is adapted for engagement with the sprocket holes 38 in the film strip 28, sprocket 62 being fixedly mounted upon a shaft 64 which is journalled in a bearing on a plate member 67 forming a part of the film traversing and projecting unit 27. Unit 27 is removably secured to plate member 11 as by securing plate member 67 to plate member 11 by studs or machine screws, as shown. The second means for feeding the film at constant speed is located beyond the projector gate and the second loop-forming member (FIGS. 3, 5, and 6). Such means includes a second, lower film feeding sprocket 65 which is mounted upon a shaft 66 journalled in the main plate 67 of the film traversing and projecting unit 27. The unit 27 is mounted on the main plate 11 of the projector at a forward portion 69 of the window or opening therethrough; such film traversing and projecting unit 27 may be removed as a whole from the plate 11 by loosening and removing the studs which secure plate 67 to plate 11.

The bearing for shaft 64 is continued inwardly past surface 14 of plate 11 in the form of a sleeve integral with plate 67, and the bearing for shaft 66 is carried inwardly in the same manner as a sleeve integral with plate 67 (FIG. 2). Mounted on shaft 64 inwardly of its bearing sleeve is an upper worm gear 74 which meshes with worm 59 on shaft 32; a lower worm gear 75 is similarly mounted upon shaft 66. Thus gears 74 and 75 and the sprockets 62 and 65 driven thereby rotate in opposite directions upon the rotation of shaft 32. Mounted on face 14 of member 11, generally above gear 74, is an L-shaped lever 76 which forms a part of the mechanism whereby the shaft 42 mounting the take-up reel 41 may be selectively driven to take up the film strip. Lever 76 has a first, upwardly and rearwardly inclined arm 77 which is pivotally attached by a pivot pin 79 to a boss projecting from face 14 of member 11. Lever 76 is guided for limited oscillation about pin 79 by means of a headed stud 81 threaded into a further boss on member 11 and projecting through an arcuate slot 80 in the arm 77. Fixedly mounted on the lower end of lever 76 is a shaft 82 upon which there is rotatably mounted a pulley 84. Pulley 84 is drivingly connected to a pulley 85 affixed to the inner end of the shaft 42 mounting the take-up reel by a resilient belt 86 which, in the embodiment shown, is in the form of an elongated coil tension spring. Inwardly of pulley 84 and affixed thereto is a first, smaller diametered rubber tired wheel (not shown) which is selectively engaged with the teeth of the upper gear wheel 74 to drive the take-up reel 41 of the projector.

Lever 76 has a second somewhat shorter and forwardly and upwardly inclined arm 89 formed integrally therewith. At its outer free end the arm 89 is bent inwardly towards surface 14 of member 11 to form a horizontal ear member 90. The tension imposed upon pulley 84 and thus upon lever 76 by the resilient belt 86, and the disposition of the parts, are such as constantly to cause the belt to urge the rubber tired wheel affixed to pulley 84 into contact with gear 74, as described. The driving mechanism includes control means for selectively raising the lever 76 to disengage the described rubber tired wheel from the gear 74. Such control means includes a vertically reciprocable link member 91 which is guided adjacent its upper end by a headed stud 94, such stud being threaded into frame member 11 and extending through an elongated vertical slot 92 in such link member 91. Member 91 is selectively reciprocated so that its upper end 95, in one position, engages and lifts the ear 90 of lever 76, and in another position is moved downwardly from engagement with such ear so that the resilient belt 86 may then move the lever arm 77 downwardly to bring the rubber tired wheel affixed to pulley 84 into driving engagement with gear 74, as described.

At its lower end, link member 91 has a laterally outwardly bent ear 96 (FIG. 2) upon which a stub shaft 97 is fixedly mounted. Rotatable upon shaft 97 is a second rubber tired wheel, designated 99, having a somewhat smaller diametered pulley 100 integral therewith. A resilient belt 102, also in the form of an elongated coil tension spring, connects pulley 100 to a pulley 101 which is fixedly secured to the inner end of shaft 40 upon which a film supply reel 39 for the projector is mounted, such belt constantly pulling pulley 100 in a downward direction. Belt 102 functions drivingly to couple pulleys 100 and 101, when pulley 100 is lowered, while permitting pulley 100 to be selectively moved up and down a short distance to engage the rubber tired wheel 99 with the knurled wheel 61 on shaft 32 and to remove wheel 99 from engagement with wheel 61. Such movement of member 91 is provided by control mechanism which, in the illustrative embodiment, also selectively functions to turn the motor 30 on or off and to cause it to rotate in either the forward or reverse direction, as desired, by actuating a three-position switch 114, to be described.

Such last mechanism includes a forwardly directed ear 104 on the bottom of link member 91, ear 104 extending parallel to the surface 14 of frame 11. A control knob 105 (FIGS. 1 and 3) is mounted on side 12 of the frame member 11 on the outer end of a control shaft 106 which projects through member 11. Affixed to the inner end of shaft 106 beyond surface 14 of the frame is a double-armed lever having a first, forwardly projecting arm 107 which is loosely pivotally connected to the ear 104 by a headed pivot pin 109 affixed to arm 107 and extending through a hole in the ear 104. The double-armed lever has a second, rearwardly directed arm 110 by means of which the three-position control switch 114 for the projector is operated. Arm 110 is provided with an open ended U-shaped slot 111, such slot receiving an operating lever 112 for the switch 114.

The arrangement of the parts is such that when the knob 105 is in its mid-position, the switch 114 is in its "off" position, the respective rubber tired wheels are removed from engagement with the gear 74 and knurled wheel 61, and the supply and take-up reels are both then undriven. When the knob 105 is turned into a first, "forward" terminal position, clockwise in FIG. 3, the projector 10 operates in its forward direction at a speed governed by a rheostat 359 to be described. Thus the first described rubber tired wheel engages gear 74 whereby to power the take-up reel, the motor 30 is energized, and rubber tired wheel 99 is removed from engagement with the knurled wheel 61. When knob 105 is turned in the opposite direction into its second terminal position, switch 114 is shifted into its "reverse" position in which motor 30 rotates in the opposite direction. The first described rubber tired wheel, however, is now lifted from gear 74, so that reel 41 is now undriven, and rubber tired wheel 99 then engages the knurled wheel 61, whereby to drive the supply reel in a film taking-up or rewinding direction. As will appear hereinafter, the driving of the reels 39 and 41 in such reverse direction both permits the rewinding of the film at high speed in a normal manner and permits the film to be shown, if desired, in a reverse direction at normal or variable speed as provided by adjustment of the rheostat 359.

*Film feed gate-unit 27*

As above set forth, unit 27 (FIGS. 1, 3, 5, and 6) in the illustrative embodiment is made removable from the main frame member 11 of the projector; the casing and main plate 67 of such unit may conveniently be formed in one piece by die casting. At its upper, film entering portion the frame of unit 27 is provided with a curved upper hood portion 119 which is spaced from and generally concentric with the upwardly convex boss or sleeve 120 which is fixed to plate 67 and which forms a bearing for the shaft 64 mounting the film feeding sprocket 62. The hood portion 119 and the boss 120 extend laterally outwardly from the main plate 67 of unit 27 to a position somewhat laterally inwardly of the sprocket 62. The film upon being entered into unit 27 rests upon a laterally outwardly projecting lower ear 122 integral with the plate 67 of unit 27, and passes beneath a fixedly mounted double-cone guide 121 which is disposed in advance of sprocket 62. In such threading operation, the motor 30 of the projector is energized and the above described driving mechanism is positioned in its forward driving direction; thus the teeth of sprocket 62 enter the sprocket holes 38 (FIG. 14) in the film 28 and positively drive the film to advance it to the projector gate.

To insure the proper presentation of the film to the projection gate, the first perforation or sprocket hole 38 in the entering end of the film should be located at a predetermined distance from the first frame of the film. It is also desirable that the entering or leading end of the film be rounded, so that it passes freely through the various film guiding means of the projector. The forming of the entering end of the film in the manner described may be conveniently effected by a film cutter generally designated 123 which, in the illustrative projector, is fixedly attached to one of the arms 17 of the rear support 16 for the projector. Such film cutter, which is of conventional structure and forms no part of the present invention, is provided with two longitudinally spaced projections which extend through two sprocket holes in the film and accurately locate the film with respect to the cutting edges of the cutter. Such cutting edges are curved in contour, thus to produce a correspondingly shaped cut forward end of the film.

Rearwardly of the boss 120 (to the left as it is shown in FIGS. 5 and 6), the hood portion 119 on plate 67 is reversely curved and then merges with a vertical flange portion 124. As set out below, and as shown in FIG. 5, the plate 268 of a lens barrel mounting unit 265 have similar portions 119' and 124' formed integral therewith, such similar hood portions 119' and 124' confronting and being aligned with the hood portion 119 and flange portion 124 when unit 265 is in its closed, operative position. As shown in FIGS. 3, 4, 6, 34, and 35, and as more fully described below, the hood 119, 119' and the flange 124, 124' do not at any time enter into the guiding of the film. The hood and flange are provided for safety, to cover the upper sprocket and the film running thereover, and to protect them from dirt and dust.

A block 125 which, in the construction shown is formed by die casting integral with the plate 67 of the unit 27, provides film guiding portions for cooperation with the film in its travel rearwardly of the upper sprocket 62 and through the upper loop former 144. The upper surface of block 125 immediately rearwardly of boss 120 is upwardly concave at a zone 128, such concave zone merging smoothly into an upwardly and rearwardly inclined zone 126. At the top of zone 126 the film guide is upwardly convexly curved at 127, and then merges into a short vertically disposed guide zone 129 which is aligned with the vertical path of travel of the film through the projector gate.

Below the film projecting opening in the unit 27 there is provided a generally similar but inverted guide means in the form of a lower fixed guide block 130 which may likewise be formed as an integral part of the described die cast body of unit 27. Block 130 has a short vertically disposed film guiding portion 131 which is vertically aligned with the film guiding surface 129 of the upper guide block 125. The lower end of vertical surface 131 merges smoothly with a downwardly convex film guiding zone 132 which in turn leads to an upwardly and forwardly inclined guide portion 134. The forward end of guide portion 134 leads into a downwardly concave arcuate hood portion 135, the laterally outer edge of which is disposed somewhat laterally inwardly of the lower film feeding sprocket 65. Radially spaced from the inner surface of hood portion 135 there is disposed a boss fixed to plate 67 of unit 27 and having a curved outer surface 136 generally parallel to hood portion 135 and forming a guide for the film passing around sprocket 65. Such boss forms a part of the bearing for the shaft 66 upon which the lower sprocket 65 is mounted. Disposed beneath the exit end of the inclined guide portion 134 there is a short upwardly and forwardly inclined lower guide member 137 which leads the film strip upwardly and forwardly into contact with the sprocket 65 and with the guide surface 136.

Forwardly of the hood 135 and the guide surface 136, the plate 67 of unit 27 is provided with an outer guide portion 139 which extends downwardly and slightly rearwardly from a zone somewhat above the horizontal diameter of sprocket 65 (FIG. 6); guide portion 139 extends laterally outwardly somewhat beyond the sprocket 65, as shown in FIG. 5. A short downwardly and rearwardly inclined inner guide 138 (FIG. 6) is provided spaced radially inwardly from guide 139 and extending from the forward edge of the curved inner guide 136 to a location radially outwardly of the sprocket 65 at a location somewhat below the horizontal diameter of such sprocket, whereby to strip the film from the teeth of the sprocket 65 after the film has travelled therepast.

The plate 268 of the lens barrel mounting unit 265 is provided with guide portions 132' and 134' and hood portion 135' which, when the unit 265 is in its closed, operative position, are aligned with and, in effect, form prolongations of guide portions 132 and 134, and of hood portion 135, respectively. The hood 135, 135' performs little, if any, guiding function upon the film strip, serving to protect and conceal the lower sprocket 65 and the film passing thereabout. Upon leaving the lower loop former 145, the film passes upwardly and forwardly generally along the guide 134, 134' into contact with the sprocket 65 and the outer surface 136 of the lower boss. During both the initial threading of the film through the projector, with the loop formers in their inner, operative positions, and under steady operating conditions with the loop formers retracted, the film passes from the lower loop between guides 134, 134' and guide 137 generally free of contact with either or with hood 135, 135'.

The film strip upon leaving the lower feeding sprocket 65 travels downwardly in contact with the inclined outer guiding surface 139 and thence around a curved portion 140 of the outer guide and into the forward end of a generally horizontally disposed closed film guiding channel or track portion on unit 27. The leading end of such film guiding channel portion is formed in part by an outer or lower guide member 141 and an inner or upper guide member 142 spaced therefrom and disposed generally parallel thereto. The forward end of such film guiding channel is completed by a depending lower portion 268 of the plate 266 which forms a part of the lens mounting unit 265, such lower portion 268 of the plate 266 having a laterally inwardly projecting guide portion 142' formed integral therewith and shaped and positioned to form a lateral extension of guide 142 when the lens mounting unit is in closed, operative position. As described above, and will appear more fully hereinafter, the lens mounting unit 265, which is preferably formed by die casting, has integral therewith and disposed on its inner surface hood and/or film guiding members which are generally aligned with those above described which are associated with the blocks 125 and 130. Parts of the hood and/or film enclosing portions on the lens mounting unit which confront and cooperate with fixed hood and/or film guiding portions when the lens mounting unit is in closed, operative position are, as above noted, designated by the same reference characters but with an added prime.

FIGS. 34 and 35 show the above described relationships between the film 28, the upper sprocket 62, and the film guides at such sprocket. As particularly shown in FIG. 34, the film 28 upon leaving sprocket 62 travels rearwardly and thereafter first contacts the upwardly concave guide portion 128, 128′ substantially to the rear of the sprocket. From the guide portion 128, 128′ the film travels upwardly and rearwardly to the entering end of the upper loop former 144.

FIG. 35 shows the film in its lateral relationship with the teeth of the sprocket 62 and the lateral surfaces of the film receiving channel at such sprocket. The lens barrel mounting unit 265 is there shown in closed, operative position, the film travelling over sprocket 62 and the surface of boss 120, and through a channel formed by boss and sprocket, the laterally outer surface of plate 67 of unit 27, the inner surface of the upper forward portion 263 of plate 266 of unit 265, and the inner lower surface of hood 119, 119′. As described above, and as evident in FIG. 35, the film 28 is appreciably spaced below the inner surface of hood 119, 119′.

The distance between the confronting surfaces of plate 67 and of plate portion 263 at the channel somewhat exceeds the width of the film. In FIG. 35 the edge 234 of the film is shown spaced somewhat from the confronting surface of plate 67, and the edge 228 of the film is shown spaced from the confronting surface of plate portion 263. The width of sprocket holes 38 in the film 28 somewhat exceeds the width of the sprocket teeth 62′ of sprocket 62, as shown. The construction of the parts is such that in its travel through the film receiving channel the film is free for lateral or edgewise travel from a position in which edge 228 of the film engages plate portion 263 to a position in which edge 234 of the film engages the confronting, laterally outer surface of plate 67. The film is thus free from lateral binding in its travel, either by the confronting surfaces of plate 67 and plate portion 263 or by engagement of the sprocket teeth 62′ with the lateral ends of sprocket holes 38 in the film.

*The loop formers*

As above indicated, the illustrative embodiment of the projector of the invention is provided with loop-formers disposed in advance of and at the exit end of the projection gate, whereby to provide sufficient slack to permit the intermittent feeding of the film at such gate. Such loop formers are connected for equal and opposite movement between an inner, operative position at which they form or define the loops, and an outer, inoperative position in which they are removed from contact with the film at the loops therein. In the embodiment shown, the movement of the loop formers to their outer, inoperative positions is automatically effected upon completion of the threading of the film through the projector.

The upper loop former is generally designated by the reference character 144 and the lower loop former is generally designated by the reference character 145. The upper loop former 144 (FIG. 12) has a vertically disposed body 149 which both forms a guide for the laterally inner edge 234 of the film strip 28 and a guiding and mounting means for such loop former. The loop former 144 has a headed portion 146 provided with a depending outer flange 148 and with a lower inner surface 147 having film guiding surfaces lying spaced from and generally parallel to portions 126, 127, and 129 of the fixed film guide on block 125. As shown in FIG. 12, however, the surface 147 is tipped somewhat, so that the loop former contacts only the laterally inner, upper corner of the film strip at the smooth, unperforated edge 234 thereof (FIGS. 12 and 14). Loop former 145 (FIGS. 8 and 9) is similarly formed, having a flanged guiding portion 151 with an upper curved film guiding surface 152.

The body 149 of loop former 144 extends downwardly into a vertical space 150 in the block 125 at the location of the rear film guiding portions thereof, member 144 being accurately guided laterally by the engagement of its body 149 with the surfaces of the block 125 bounding space 150 therein.

Projecting through an opening or window 158 (FIG. 2) in plate 67 of unit 27 is a bracket 157 having its upper end secured to the upper loop former 144 by screws 159. Window 158 is aligned with the forward end portion 69 of the opening through plate 11 of which opening 47 is a part. Bracket 157 is bent horizontally to extend through the window 158 in plate 67 and the portion 69 of the opening through plate 11 and then vertically to form a depending arm 160 which overlies the inner surface of plate 67 and is spaced somewhat therefrom. Arm 160 has an elongated vertical slot 161 therethrough, such slot receiving vertically aligned spaced guiding shoes 163 mounted on upper and lower retaining screws 162 and 164 threadedly mounted on plate 67 of unit 27. Plate 67 has a lower window or opening therethrough, such window receiving a bracket 165 which is secured to the lower loop former 145 by screws 166 (FIGS. 8 and 11). Bracket 165 is bent to have a portion thereof disposed horizontally and extending through said window in plate 67 and an upstanding arm 167 which closely overlies the surface of the plate 67 beneath the above described arm 160. Arm 167 is provided with an elongated vertical slot 169 through which the above mentioned guiding and retaining guide shoes 163 and screws 162 and 164 extend, as shown in FIGS. 8 and 9.

The arms 160 and 167 and the loop formers 144 and 145 secured thereto, respectively, are drivingly coupled for vertical movement of equal amounts in opposite directions. Such connection (FIGS. 8 and 9) is provided by a rocker lever 170 which is pivotally mounted upon the upper screw 162 and overlies the arm 160. Lever 170 has a first arm 171 having a finger 172 on the outer end thereof, such finger being bent inwardly toward the plate 11. The end of finger 172 is received within a notch 174 on the forward edge of arm 160 so as to have free rocking driving movement with respect thereto. Lever 170 has a second, rearwardly directed arm 175, of the same length as arm 171, which has a laterally inwardly bent finger 176 on its rear end. Finger 176 is received within a notch 177 on the rear edge of the arm 167 so as to have free rocking driving movement with respect thereto. Thus when the upper loop former 144 is pressed downwardly from its upper terminal position to its lower or inner position, the arm 160 thereon turns lever 170 clockwise (FIG. 9) thereby to lift the arm 167 and the lower loop former 145 attached thereto through an equal distance into its upper or inner position. The described connection between the loop formers 144 and 145 also functions to retract them through equal distances from each other when they are released from their inner, operative loop-forming positions. The loop formers 144 and 145 are constantly urged toward their outer, retracted positions by a coil torsion spring 179, the coiled body of which is mounted upon the boss 68 on plate 67 which forms a bearing for shaft 66 (FIGS. 8 and 9). The spring 179 has a first end or tang 180 thereof which extends through a hole 178 in a laterally extending tab 182 on the lower end of arm 160. The other end or tang 181 of spring 179 extends through a hole 183′ in a laterally outwardly bent tab 183 which is an integral part of the arm 167. It will be apparent from the above that the spring 179 acting through its tangs 180′ and 181 constantly urges the arm 160 and the loop former 144 upwardly and the arm 167 and the loop former 145 downwardly.

The tab 182 of the arm 160 is continued into an end portion 184 thereof which is disposed generally horizontally. Portion 184 coacts with the operating means for a switch 185 which is interposed in the control circuit of the projector in the manner shown in FIG. 30, and functions automatically, in a manner to be described, to turn on the projector lamp 26 and to extinguish the room illuminating lamp 43 when the threading of the projector has been completed. The completion of the threading operation is detected by means, now to be described, which is responsive to increased tension in the portion of the film strip 28 lying between the second, constant speed feeding sprocket 65 and the take up reel 41 for the film. Such tension responsive means also functions to cause the loop formers 144 and 145 to be retracted from their inner, operative positions to their outer inoperative positions.

The tension responsive means employed in the illustrative embodiment includes a double-coned film engaging member 186 which is fixedly mounted upon a shaft 187 which extends through a slot 186' in the body of unit 27 so as to be free for a relatively short travel in a vertical direction. Member 186 is so mounted that in its lower position, in which it lies when the loop formers are in their inner, operative positions, it lies somewhat above the forward inner curved surface of the lower film guiding member 140. Member 186 is thus disposed generally at the bight of the salient zone of the film as it initially travels downwardly past and substantially in contact with the guide portions 139, 140, and 141, after leaving the lower film feeding sprocket 65. The inherent tendency of the film to curl in the direction in which it had been coiled, and the fact that sprocket 65 pushes the film strip through the guide channels of the projector, cause the film strip to hug the outer parts of the guide channels during the threading operation.

The spacing of the guide portions 141 and 142 is such that when the portion of the film 28 running past member 186 is tightened by being drivingly engaged by the take-up reel, the film leaves the outer surfaces of portions 139, 140, and 141 of the guide channel, and engages the member 186 to thrust it upwardly into its upper terminal position. Member 186 and the mounting shaft 187 therefor function to operate a latching means which holds the loop formers in their inner, operative position during the initial threading of the projector, the described upward movement of member 186 and the swinging of its mounting shaft 187 caused by such tightening of the leading end of the film releasing the latching means and thereby permitting the retraction of the loop formers by spring 179 in the manner described.

The inner end of shaft 187 is secured to the forward end of a first arm 189 of a lever 188 which overlies the face 14 of the plate 11 and is pivotally attached to such plate by a pivot pin 190. Lever 188 has a rearwardly and upwardly directed arm 191 having a latch forming edge 192 thereon rearwardly of a notch 193 in the upper edge of arm 191. Edge 192 selectively cooperates with the lower edge 194 of tab 183 on arm 167 secured to the lower loop former 145. The relationship of the parts is such that when the loop formers are thrust towards their inner, operative positions, as by depressing the upper loop former 144 in the manner indicated in FIG. 9, the latch forming edge 192 falls beneath and underlies the lower edge 194 of latch tab 183 and retains such plate and its arm 167 in their upper position. The loop formers are thus held in their inner, operative positions until the latch forming edge 192 is swung a short distance counterclockwise (FIG. 8) by the moving upwardly of the tension responsive member 186; when this occurs, the latch forming edge 192 is removed from the path of travel of the latch tab 183, thereby permitting the loop formers 144 and 145 to be retracted to their outer, inoperative positions under the influence of the spring 179 and of gravity acting upon the lower loop former 145 and of the parts directly connected thereto.

The switch 145, which is operated by the loop formers, is best shown in FIG. 10. Such switch has a main insulating plate 392, which is mounted upon the frame plate 11 by a bracket 393. Mounted upon plate 392 are a lower fixed contact 394 and an upper fixed contact 395 spaced therefrom. A movable contactor 396, moved with a snap action by toggle means, carries a contact which selectively engages fixed contacts 394 and 395. The switch has an operating arm 397, such operating arm 397 and the contactor 396 being normally held in their upper and lower positions, respectively, by a coil tension spring 399 extending between the lower forward end of the arm and an intermediate point of the contactor. The upper forward end of arm 397 has an insulating pad 400 secured thereto. Upon the descent of arm 182 affixed to the lower loop former 145, the tab 184 affixed to the lower end of arm 182 thrust pad 400 and the operating arm 397 of switch 185 downwardly, thereby impelling the contactor 396 into its upper position, as shown in FIG. 10. As will be apparent from the wiring diagram of FIG. 30, when the contactor 396 of switch 185 lies in its upper position, the room illuminating lamp 43 is energized and the projecting lamp 26 is de-energized; when the contactor 396 lies in its lower position, the room illuminating lamp is de-energized and the projecting lamp 26 is energized.

*The intermittent film feeding mechanism*

The intermittent film feeding mechanism at the gate of the projector is generaly designated by the reference character 35; such mechanism, best shown in FIGS. 14 and 16–20, inclusive includes means for driving and adjusting film feeding claws 217 and 219. Such mechanism, which is operative upon the run of the film disposed between the vertical guiding surface 129 on the upper guide block 125 and the vertical guiding surface 131 on the lower guide block 130, is constructed and operates as follows. As above described, an arm 198 is integrally attached to plate 67 of unit 27 and projects laterally beyond side 14 of frame plate 11. Pivotally mounted upon arm 198 near the root of the arm and adjacent side 14 of plate 11 is an elongated plate 195 having generally the same width as the arm 198. Plate 195 is mounted upon and is adjustable angularly about a pivot pin 196 disposed adjacent the laterally inner end of the plate, the plate being held in its adjusted angular position by means of a screw 199 threaded into the outer end of arm 198 and extending through an arcuate slot 197 adjacent the outer end of the plate 195.

A threaded pin 200 is adjustably mounted upon plate 195 outwardly of the longitudinal center of the plate, pin 200 extending through a longitudinally extending slot 201 in the plate 195. The pin 200 is retained in adjusted position longitudinally of the plate 195 by a bushing 203 which is screwed onto the pin, the bushing having a head 203' which lies rearwardly of plate 195 at the slot 201. Bushing 203 has a forwardly extending sleeve portion 205 which is threaded to receive a retaining nut 204. The sleeve portion 205 is flatted at its top and bottom by the removal of the threads therefrom, the resulting flat surfaces 205' accurately engaging the opposed elongated surfaces of slot 201. Thus the position of the threaded pin 200 relative to the plate 195 may be adjusted by loosening nut 204, moving the pin 200 along the slot 201 as required, and tightening the nut 204 to retain the pin 200 in adjusted position on plate 195. The bushing 203 is retained from turning with respect to the threaded pin 200 by a lock nut 206 screwed onto the pin and abutting the outer end of sleeve 205.

The arm 198 is of C-shaped vertical section, having a vertically disposed forward web at its forward end. Such vertical web of arm 198 is cut away, as shown in FIGS. 18 and 19, to form an opening 202 which receives the head 203' of the bushing 203. The opening 202 thus provides substantial freedom of adjusting movement of the threaded pin 200 and of the bushing 203 thereon, both for movement of such threaded pin longitudinally of plate 195 and for the pivotal adjustment of plate 195 about its pivot pin 196.

Pivotally mounted on the rear end of pin 200 is a generally L-shaped mounting plate 207 for the said film engaging claw means 217, 219. As shown, plate 207 is disposed beneath the head 209 of pin 200 and between it and a resilient spring washer 208 which is firmly pressed against the plate by a nut 210 disposed on pin 200 forwardly of the washer. The plate 207 may be rocked within limits about the axis of pin 200 by means of a lever 211 which forms one portion of the plate and extends laterally inwardly toward the plate 11, through the opening in such plate at which unit 27 is mounted, and outwardly through a vertical slot 212 through the vertical rear portion 214 of the film feeding unit 27. Such angular adjustment of plate 207, as will appear, provides for adjusting the "framing" of the film at the projecting gate.

The film engaging and feeding means proper is in the form of an elongated leaf spring 213 which extends generally parallel to the adjusting lever 211 and terminates inwardly at an intermediate zone of mounting plate 207. The outer end 215 of leaf spring 213 is bent forwardly at 216 and is notched so as to provide an upper film engaging claw 217 and a similar lower claw 219, the claws being so spaced as to extend into successive sprocket receiving openings in the film strip and to receive therebetween the unperforated portion or rung 218 of the film. As will be more fully described hereinbelow, the claws 217 and 219 extend through and are vertically reciprocable through window 223 in the forward wall 222 of portion 214 of unit 27 and in a vertical slot 220 in the body-forming plate 235 of a film guiding means, to be described, at the projecting gate. In the normal, forward projecting travel of the film the claws first move forwardly (to the right in FIG. 20) into engagement with the film strip 28, and then travel downwardly a distance corresponding to the width of one frame of the film, thereby to present a new frame of film in correct alignment at the projection gate. Following this, the claws are rearwardly retracted from the film (to the left in FIG. 20) and then caused to travel upwardly so as to be in position for their next film feeding cycle. To permit such vertical movement of the film-engaging claws, at its rear or inner end, beyond the surface 14 of plate 11, the end of the leaf spring 213 is pivotally connected to the laterally inner, upper edge portion of the adjustable mounting plate 207 by pivot means 224.

The leaf spring is driven so that the claws thereon are given the described motion, both forwardly and rearwardly of the projector and up and down with respect thereto, by the following mechanism. Secured to the leaf spring 213 intermediate the length thereof is a cam follower 225 in the form of a button which is received within the cam track 227 of the cam 54. Cam 54 is of the so-called box type, having a bottom cam surface 226 of variable axial depth, the cam track 227 also having inner and outer parallel walls 229 and 230, respectively. The contour of the cam follower 225 is such that it accurately engages the bottom surface 226 of the cam track at all times while being accurately positioned vertically with respect to the frame of the projector by its engagement between the side wall surfaces 229 and 230 of the cam. The cam follower 225 is maintained in accurate engagement with the cam track, as described, a coil compression spring 231 which has one end thereof mounted on a boss 233 forming a spring seat on the rear side of the fixed arm 198 opposite the cam follower, and the other end thereof received in a spring seat on the forward end of the cam follower 225 attached to the leaf spring. Such construction insures accurate engagement between the cam and cam follower at all times while permitting the cam follower 225 and the leaf spring 213 to move as required both by the interaction with the cam and by the adjustment of the axis of the pivotal connection 224 of the leaf spring to its mounting plate 207 upon the angular adjustment of such plate.

The construction of the pivotal connection 224 between the leaf spring 213 and the adjustable mounting plate 207 is more particularly shown in FIG. 16. The plate 207 is provided with a hole 370 therethrough, the plate being struck up from the rear about such hole to form an annular bearing member 371 which is of domed shape in radial section. The portion of the leaf spring 213 at the pivotal connection 224 has a part-spherical rearwardly convex depression 372 therein. A part of the depressed portion 372 extends into the hole 370, the flat portion of the leaf spring surrounding such depression lying upon the annular domed bearing 371. Parts 213 and 207 are retained in the position shown in FIGS. 14 and 16 by means of a spring keeper member 374 which is secured at its lower end portion 375 to the plate 207 by rivets 376. Above portion 375, the keeper is bent forwardly and then lies vertical and generally parallel to the plate 207. Vertical portion 373 of the keeper is provided with a part-spherical rearwardly convex depressed portion 377 which forcibly engages the complementary forward surface of part 372 of the leaf spring.

The described construction of the pivotal connection 224 permits the leaf spring 213 to be pivoted freely in vertical directions about such pivotal connection, and at the same time permits a limited rocking of the member 213 in horizontal directions about such pivotal connection. Thus the member 213 is able to move as required by the cam 54, the pivotal connection 224 insuring the accurate positioning of member 213 during all portions of its operating cycle while decreasing the flexing forces which might otherwise be imposed upon if a conventional pivot pin connection were employed instead of the connection 224.

It will be apparent from the above that the vertical position of the claws 217 and 219, at any point in their feeding cycle, may be substantially adjusted by swinging plate 207 about the axis of its mounting pin 200 to a new position wherein it remains stably by reason of its engagement with the spring washer 208. The film strip at the projecting gate engaged by claws 217 and 219 may thus be adjusted as required to bring the frames of the film into correct alignment with the gate.

*The film guiding means at the projection gate*

The film guiding means at the projection gate is best shown in FIGS. 5, 6, 14, 15, and 24. Such means has two main parts, a first one of which is fixedly attached to the frame of unit 27 of the projector and the other of which is secured to the hinged lens mounting unit. The first of such parts, generally designated 236, is removably mounted upon the forward wall 222 of the portion 214 of the film feeding unit. The portion of such means which guides the laterally inner edge 234 and the broad surface of the film has a main body generally in the form of a plate 235. The outer edge of plate 235 is secured to the forward wall 222 of portion 214 beneath a plate member 243 by means of studs 248 extending through such member and plate and threaded into wall 222 of portion 214. As will appear below, member 243 forms a portion of a hinge means 245 which secures the lens mounting unit of the projector to the film feeding unit 27. The plate 235 and the laterally inner edge 244 of the member 243 form a channel 237 throgh which the film strip 28 travels at the projection gate. The laterally central portion 239 of channel 237 has a rearwardly depressed bottom surface 240 so that the picture area of the film strip is supported free of contact with the guide, the laterally inner edge portion of the film strip beyond the picture area lying upon an inner vertically extending guiding surface 241 lying laterally outwardly of a shallowly bent zone 238, and the laterally outer edge portion of the film strip overlying a somewhat broader vertically disposed guiding surface 242. The end of the leaf spring 213 carrying claws 217 and 219 extends through a slot 220 in surface 242 aligned with the slot in wall 222 of portion 214. The laterally inner side edge 244 of hinge portion 243 forms a guide for the laterally outer edge 228 of the film strip adjacent which the perforations 38 in the strip are located. The laterally inner edge 234 of the film strip, which in 8 mm. film usually is formed by the shearing of a 16 mm. film longitudinally, is resiliently engaged at all times by laterally outwardly spring pressed guiding shoes positioned, respectively, above and below the projecting gate. Such shoes function to maintain the smooth, outer uncut edge 228 of the film strip in accurate contact with the inner guiding edge 244 of member 243.

Laterally inwardly of the guiding surface 241, the plate 235 is extended to lie with its laterally inner portion 246 extending through a window in the plate 67. At its upper end and adjacent the guide surface 241 such inner portion 246 of the plate is notched at 247 above the projection gate to permit an upper film guiding shoe 250 to project therethrough. The portion 246 of the plate 235 is similarly notched at a zone 247' below the projection gate to receive a lower guide shoe 251. The upper and lower film guiding shoes 250 and 251 are formed as parts of a plate-like lever 249 which lies rearwardly beneath the laterally inner portion 246 of plate 235, lever 249 being pivotally attached at its center to plate portion 246 by a pivot pin 253. The upper and lower laterally outer edges of the member 249 are provided with laterally outwardly projecting arms 252, the outer ends of which are bent forwardly from the plane of the member 249 and are then bent about horizontal axes to form the vertically curved upper and lower guide shoes 250 and 251, respectively.

The pivot pin 253 is rigidly attached to the portion 246 of the plate 235 and loosely extends through a laterally elongated hole 255 in member 249. The lever member 249 thus has substantial freedom of movement in a horizontal direction relative to plate 235. Member 249 is retained upon the pivot pin by a washer 254 which overlies the hole 255 and is of substantially greater diameter than the hole, the washer being secured to the pivot pin as by being riveted thereto.

The plate member 249 is constantly resiliently urged in a laterally outward direction toward a terminal position in which the shoes 250 and 251 engage the outer edges of the notches 247 and 247' in the plate 235. In the embodiment shown, such notches extend slightly into the laterally inner portion 241 of the film guide at the gate, so that a film strip of normal width in traveling through the guide thrusts both guide shoes 250 and 251 laterally inwardly to some extent.

The shoes are yieldingly held against the edge 234 of the film strip by means of a torsion coil spring 261 which is mounted as follows. Adjacent its upper laterally inner corner, the plate member 249 is provided with an ear 260 which is bent rearwardly and then upwardly with respect to the plane of member 249. The central coiled portion of the spring 261 is disposed about the rearwardly extending portion of the ear 260. One end or tang 262 of the spring 261 is loosely received in a hole 257 in a second, rearwardly extending ear 256 on member 249 at the upper edge of a notch 380 in such plate. The other end or tang 264 of the spring 261 is loosely received in a hole 259 in a rearwardly extending ear 258 at the lower edge of a notch on the inner edge of the portion 246 of plate 235. The ear 256 on plate 235 extends through the notch formed in plate member 249 by the formation of the ear 258 thereon.

In its relaxed position, the plate member 249 assumes a laterally outward position with shoes 250 and 251 in contact with the outer edges of notches 247 and 247', and the upper edge 381 of the notch in plate member 249 in engagement with the upper edge 382 of ear 256 at the root thereof. The described construction and mounting of the plate member 249 and the portion 246 of plate 235 is such, however, that not only can the film guiding shoes 250 and 251 yield laterally inwardly but they are connected for joint pivotal movement in reverse directions generally about the pivot pin 253. The guide shoes 250 and 251, acting in cooperation with the inner side edge 244 of the hinge portion 243, function at all times to hold the outer edge 228 of the film strip 28 accurately in engagement with such edge surface 244. Thus the film guide prevents any jamming of the film which might be caused, if unyielding guide means were employed at the projection gate, by occasional inaccuracy of the inner edge of the film caused by the slitting of a film of double width. At the same time, as above explained, shoes 250 and 251 constantly maintain the accurate, smooth edge 228 of film strip 28 in engagement with the guiding surface 244, whereby to insure the accurate lateral positioning of the film strip with respect to the projection gate and the intermittent film feeding claws 217 and 219.

*Lens mounting unit*

The lens mounting unit of the projector 10, which is designated generally by reference character 265, is best shown in FIGS. 5, 7, and 13. Unit 265 has a main plate portion 266 which is mounted upon the forward wall 222 of the portion 214 of the film projecting and traverse unit 27 by the above-mentioned hinge means 245. A portion of hinge means 245 is formed on a rear extension 269 of plate 266, such portion having aligned upstanding and depending pintle pins 270 and 270' formed integrally with the rear end of plate extension 269. The above referred to hinge member 243 has outwardly and rearwardly bent upper and lower ears 271 and 271' which overlie and extend partially around the pintle pins 270 and 270' in order to retain the unit 265 upon the laterally outer edge of the portion 214 of the film projecting and traversing unit 27. The thus described hinge means 267 permits the unit 265 selectively to be swung from its closed, operative position shown in FIG. 1 to the open position thereof shown in FIG. 5, wherein the film projecting gate, the loop-forming means and the upper and lower film feeding sprockets 62 and 65 are fully laterally exposed. As will appear more fully hereinafter, when the unit 265 is swung into its open position and the member 315 of the rear film guiding means is opened, as shown in FIG. 25, the film enclosing members and guides through the projector from the entering to the exit ends thereof are entirely open laterally; with these parts in such open position, the film may be removed from such guides and reintroduced thereinto when desired without disturbing the connection of the film to the film supply reel 39 and to the film take-up reel 41. The film may thus be cut and edited easily without additional winding or rewinding operations; if a film should break during its projection, as because of embrittlement due to age, it can easily be repaired by merely removing it laterally from the guiding means in the projector, splicing it, and replacing it in the projector.

Secured to plate 266 of the lens mounting unit, and preferably made integral with such plate portion, is a central box-like portion 273 having spaced upper and lower walls 272, 272' and a cover plate 276, members 272, 272', and 276 presenting a space 274 therewithin. The projecting lens is provided with a barrel 275 which is mounted in the space 274 as shown. The lens barrel is accurately guided longitudinally within space 274 by engagement of the barrel with the inner surfaces of the sides of the upper and lower walls 272, 272' and with the cover plate 276 which, as shown, spans the outer ends of the walls 272, 272' and is secured thereto by studs 277.

The lens barrel 275 is provided with threads 279 which cooperate with the inner end of an outwardly headed lens barrel-retaining pin 280, the inner portion of which is reciprocable through a hole in the cover plate 276 disposed radial of the lens barrel. The inner end of pin 280 is formed so as accurately to interfit with the groove between successive lands of the thread 279 on the lens barrel. The lens barrel may be accurately adjusted to focus the image on the screen by being screwed in and out by interaction of thread 279 with pin 280, as required. The lens barrel may, however, be quickly adjusted inwardly and outwardly to approximate focus before its accurate adjustment by being slid in the barrel retaining means 272, 276. For this purpose the pin 280 is constantly yieldably thrust radially inwardly into engagement with the lens barrel 275 by a leaf spring 281, the rear end of which overlies and yieldably thrusts inwardly the headed outer end of the pin 280.

The forward end of the leaf spring 281 is secured by a rivet 282 to the cover plate 276 of the lens barrel retaining means. The leaf spring 281 is formed with ears 283 intermediate the length of the spring, the ears extending laterally inwardly toward the plate 67 of unit 27 when the unit 265 is in its closed operative position. Ears 283 extend from the body of the leaf spring first parallel to each other, then inclined inwardly toward each other, and finally diverge. Ears 283 selectively cooperate with a horizontal cross bar member 288 on plate member 67, the ears 283 and the cross bar 288 forming a latching means which yieldably retains the unit 265 in its closed position, the ears 283 then being snapped over the cross bar 288 as shown in FIG. 13. To swing the unit 265 into its open position, it is first pulled clockwise from the position shown in FIG. 1 so that the ears 283 are then released from the cross bar 288. Following this, the unit 265 may be fully swung to its fully open position (FIG. 5).

The cover plate 276 is continued rearwardly somewhat beyond the rear end of the body of the lens barrel retaining portion 272 and is then bent laterally outwardly to lie in a plane transverse to the axis of the lens barrel. See FIGS. 5 and 7. The thus formed rear portion of plate 276 is designated 284. Portion 284 has a centrally disposed rectangular opening 285 therethrough aligned with the axis of the lens barrel so as to admit projecting light therethrough to the lens. Mounted upon plate member 284 is a film presser shoe 286 which, when unit 265 is in its closed, operative position overlies and yieldably engages the portion of the film strip disposed forwardly of and engaging the film guide 236 at the projecting gate. The presser shoe 286 is best seen in FIGS. 5 and 24.

The presser shoe 286 is mounted upon and guided by pins 287 riveted at their ends at 287′ (FIG. 24) adjacent the upper and lower ends of the shoe. The pins 287 are slidably mounted in holes in portion 284 of the mounting plate. Pins 287, which have enlarged heads 290 disposed forwardly of portion 284, are constantly urged, with the presser shoe 286 to which they are attached, toward a terminal position in which the heads of the pins engage the forward surface of plate portion 284. Such rearward thrusting of the pins and shoe is effected by coil compression springs 289 telescoped over the pins 287 and lying between plate portion 284 and the presser shoe 286.

When unit 265 is closed and a film strip 28 is disposed in the projecting gate, the presser shoe 286 lies somewhat forward of its rear terminal position, thereby thrusting the film strip accurately against the film guiding plate means 236 at the gate. Presser shoe 286 is bent upwardly and curved somewhat forwardly at its upper end to permit the smooth entry of the film strip between it and the fixed film guide means 236. The presser shoe 286 is provided with a rectangular opening 291 therethrough aligned with opening 285 to permit the passage of projecting light therethrough.

The shoe 286 is provided with a centrally depressed portion 295 at which the rear ends of pins 287 are riveted, the effective guiding surfaces 296 and 297 of the shoe being located along the side edges thereof so that the shoe does not engage the central picture carrying portion of the film strip. The presser shoe 286 is further provided with a notch 292 in its lower outer edge portion aligned with the slot 220 through the film guiding plate 236 in order to receive the film engaging claws 217 and 219 of the intermittent film feeding mechanism therethrough. The shoe 286 is further provided with notches 293 and 294 at its upper and lower laterally inner edges in order freely to receive the curved lateral film pressing shoes 250 and 251 therewithin.

The projector is provided with a plate which in its laterally inner portion 298 thereof overlies and covers the forward end of the blower or fan 31 and in a laterally outer portion 299 forms the rear wall of the part 214 of the film traversing and projecting unit 27. Light from the projector lamp 26 when such lamp is energized travels forwardly through a hole 303 in plate portion 299 through the projection opening 221 in the film guide 236, through the film strip, through the projection opening 291 through presser shoe 286, through the hole 285 in plate portion 284, and into the rear end of the lens barrel from which it is projected onto a screen.

The rear film guiding means

The unit 29, which includes a rear film guiding means for the film strip 28, has as a part thereof a member 302 which includes in its forward portion a projector lamp housing portion with an outer wall 304. As shown in FIG. 26, integral with wall 304 are inwardly projecting bosses upon which is mounted an L-shaped heat shield 305 having a side portion spaced from such outer wall and a rear portion disposed behind the projection lamp 26. The upper, outer side, and lower walls of the lamp housing portion 302 at the forward ends thereof are provided with inwardly extending flanges providing a broad rectangular opening therethrough. One such flange, 300, attached to wall 304, is shown in FIG. 26. The rear wall of the lamp housing is formed by plate 11. The portion 214 of unit 27 is provided on its upper, outer side, and lower rear end with transverse shoulders and rearwardly projecting flanges inwardly thereof, such latter flanges, one of which is shown at 301 in FIG. 26, telescoping within the flanges on the lamp housing portion 302.

Member 29 is removably mounted in its assembled, operative position by a headed stud 306 projecting through the rear body portion 308 of unit 29 rearwardly of the lamp housing 302, the stud being threaded into the frame plate 11. Body 308 is provided with grille openings, as is the top of the lamp housing, the openings through the part 308 rearwardly of the lamp housing confronting the motor 30. The construction shown therefore provides for the free circulation of cooling air from the fan 31 through the lamp housing and outwardly of the latter through the top thereof, and also provides for the circulation of air through the grille openings in the rear portion of the body 308 past the motor 30.

As shown most clearly in FIG. 25, the fixed portion 308 of unit 29 is provided with a first or inner half of a fixed film guiding track or guideway which is generally designated 309. Guideway half 309 has a generally horizontal portion 311 (FIG. 3) which extends beneath the lamp housing 302 from substantially the exit ends of the upper and lower guides 142 and 141 on unit 27. At the rear end of portion 311 the half track is smoothly curved upwardly at 312, the upper rear end of the curved portion of the track merging with an outwardly and rearwardly inclined portion 314. A member 315 including a cover plate 316 pivotally mounted upon the fixed portion 308 at the rear end thereof is provided with a mating half track generally designated 320, the parts of which are designated by the same reference characters as those of the fixed half of the guideway but with added primes. When the cover part 315 lies in its closed, operative position, corresponding parts of the track halves lie in alignment and in substantial engagement so as to form a closed film-conducting channel.

The hinge 317 which attaches member 136 to member 308 is composed of a vertical pintle pin 318 formed integral with member 308 and spanning the space between upper and lower ears thereon. Pintle pin 318 is received in an elongated seat formed in a boss 402 on the cover part 315, the cover being retained upon the pintle pin by a retaining plate member 403 secured to the upper boss 402 and to a lower boss 404 by studs 405, as shown.

The cover member 315 is provided with a hole 319 therethrough which receives the outer end of the mounting stud 306 when the cover member is in closed position. In the illustrative embodiment of the projector, a single means is provided both to retain the lens mounting unit and the cover member 315 in their operative, closed positions. Such means includes the previously described cross bar 288 on plate 67 of unit 27 and the latch-forming ears 283 on leaf spring 281, which, as we have seen, selectively hold the lens mounting unit 265 in closed position. The lens mounting unit 265, in turn, when closed, holds the cover member 315 in closed position.

The entering ends of the top and bottom portions of the movable guideway half 320 extend somewhat forwardly of the corresponding confronting portions of the fixed guideway half 310. This relationship is shown in FIG. 26 and is indicated in dotted lines at the lower right-hand corner of FIG. 25 wherein the entering end of guideway portion 320 is shown in its closed portion. The upper and lower parts of the end 310' of the movable guideway portion are grooved at their laterally outer sides at 327, the roots of such grooved portions lying in substantially the same plane as the outer edge of the lower or outer guide 141 on unit 67, and with the lower part of guideway portion 310' received within the notch 143 in the rear of guide member 141. When the units 67 and 29 are assembled in operative position, the forward grooved end 310' of the movable guideway member extends somewhat forwardly of and beneath the lower rear edge 328 of plate 268 on the lens mounting unit.

Accordingly, the cover plate 316 is prevented from opening when the parts are thus engaged and the lens mounting unit is closed. When the lens mounting unit is opened, however, and swung sufficiently for the end 310' of the movable track member to clear the lower rear edge 328 of the lens mounting unit, cover member 315 may be swung to open position as shown in FIG. 25.

The closed track or guideway formed by the mating fixed and movable guideway halves is generally of vertically flattened hexagonal shape, as shown in FIG. 28, throughout the horizontal extent thereof. As there shown, the guideway has a width between its opposite vertical sides 383 and 383' which slightly exceeds the width of the film strip 28. The guideway has oppositely and downwardly inclined bottom surfaces 385 and 385' and upwardly and oppositely inclined upper surfaces 384 and 384'. It can be seen that in traveling through such guideway the film strip is accurately held laterally and engages the upper and lower surfaces of the guideway at only the corners of the film strip regardless of whether the film strip is under no tension and being pushed by the sprocket 65, or is under tension and being pulled by the take-up reel 41.

In the portion of the guideway beginning at the upper end of the curved portion 312 thereof, the guideway has a greater dimension transverse to the width of the film strip. Thus the opposite guiding surfaces 388 and 388', as before, are spaced apart a distance but slightly exceeding the width of the film strip. Such surfaces, however, have widths which are markedly greater than those of surfaces 383 and 383'. The surfaces 389 and 389', shown at the top in FIG. 29, are oppositely inclined toward each other at an angle which somewhat exceeds the angles of opposite inclination of the surfaces 390 and 390' shown at the bottom of FIG. 29.

The described configuration of the inclined guideway leading toward the take-up reel 41 is such as to permit the film strip to have sufficient freedom of motion in a direction normal to the width thereof to be wound upon the take-up reel from the condition of an empty take-up reel to a full take-up reel without causing any scuffing of the film strip by its engagement with the surfaces 389 and 389', 390 and 390' of the guideway. For this purpose also, the lower rear portions 387, 387' of the guideway halves at the upper, rear exit ends 386, 386' thereof are flared with a smooth curvature to the rear.

The take-up reel

The construction of the take-up reel 41 is shown more particularly in FIGS. 31 and 32. As there shown, reel 41 has a hub 321 provided with a plurality of slots in its forward end whereby to be drivingly connected with the shaft 40 by means of a radially directed projection on the shaft which is received in one of the slots on the hub of the reel. The reel is retained upon shaft 40 by means of a conventional spring detent mounted on the shaft so as to engage the hub of the reel outwardly on an inwardly directed flange on the inner end of the latter. Equally angularly spaced about the periphery of the hub 321 with a spacing such that they enter some of the sprocket holes 38 in the film strip 28 and in longitudinal alignment with such sprocket holes are a plurality of hook members 322 having generally radially directed root portions 324 attached to the hub 321 and forwardly directed free ends 325. As above disclosed, the film strip 28 issues from the rear upper end 386, 386' of the guide 314, 314' and travels upwardly toward the hub 321 of the reel 41 which is then rotating in a forward, take-up direction (clockwise in FIG. 31). The unloaded speed of the reel 41 is such that the hooks 322 thereon travel at a speed which somewhat exceeds the speed at which the film strip 28 is presented to the reel. Also as above disclosed, the film strip has an inherent tendency to curve forwardly as it issues from the fixed guideway. Thus the leading end of the film strip 28 rises initially in a direction inclined to the left (FIG. 31), passing behind the hub 321, and then tends to fall forwardly above the reel into engagement therewith. At 28' the film strip is shown just prior to its engagement with the reel. The hooks 322, which are traveling faster than the film strip, thus progressively engage within the sprocket holes 38 in the film strip, whereby the strip then becomes coiled upon the hub 321 of the take-up reel 41. The driving mechanism for the take-up reel, including the resilient belt 86, then permits the take-up reel to slow down sufficiently so as not to subject the film strip to undue tension, while tensioning it sufficiently to operate the tension-responsive member 186, which causes retraction of the loop formers into their outer, retracted positions, and to insure smooth substantially tight coiling of the film strip upon the take-up reel. The hooks 322 may be of rather small radial height. In the embodiment shown, the hooks do not exceed three times the thickness of the film strip in height, and therefore do not interfere with the smooth coiling of the film strip even if such hooks should not enter the sprocket holes in the second and succeeding turns of the film strip on the take-up reel.

The single framing attachment

The illustrative embodiment of projector is provided with mechanism whereby the feeding of the film strip may selectively be stopped so as to present a single frame of the film at the projecting gate of the projector. Such single framing mechanism is shown more particularly in FIGS. 21, 22 and 23. A transverse lever 330 is mounted on a pivot pin 331 which is secured to the plate portion 298 closing the forward end of the housing of the cooling fan 31. Such lever, which extends generally horizontally, has a downwardly bent outer end portion terminating in a generally horizontal projection 332 which extends through a vertical slot 333 in the laterally outer wall 214' of portion 214 of unit 67. Such outer end of the lever is provided with an operating button 334 by means of which the lever may be depressed from its normally inoperative position, shown in full lines in FIG. 21 and in phantom lines in FIG. 22, to the operative full line position thereof shown in FIG. 22. Lever 330, when thus depressed, opens the energizing circuit to the motor 30 of the projector, thereby to stop the feeding of the film to the projecting gate, and interposes a member 339, which reduces the intensity of the light reaching the film, between the projecting lamp and the film at the projection gate.

At its inner or rear end, the lever 330 is provided with a downwardly and laterally rearwardly inclined arm 344 which functions to open a switch 345 in the energizing circuit to the motor 30 when the lever 330 is depressed. As shown in FIG. 23, the switch 345 has an insulating mounting plate 346 upon which is positioned a fixed contact 347. Cooperating with contact 347 is a movable contact 348 which is mounted on a contactor 349. Contactor 349 functions as a part of a toggle which is stably held in the contact-closed position of FIG. 23 by a coil tension spring 350 when the operating arm 351 of the switch lies in its normal position, as shown in FIG. 23. When, however, the operating arm 351 is depressed by arm 344 of lever 330 acting upon the insulating button 352 on the switch arm in the manner shown, the contactor 349 is quickly impelled by a snap action into the contact-open position of FIG. 22, thereby de-energizing the motor 30.

Pivotally mounted on a pivot pin 342 secured to a portion of the plate 298, 299 is a lever 341 having a transversely positioned multi-perforated disc 339 on its laterally outer end. The disc 339 has a diameter which somewhat exceeds the diameter of the hole 300 through the plate portion 299, and the holes 340 therethrough are so positioned as to be uniformly distributed throughout the area of such opening 300 when the plate 339 is in the operative position shown in FIG. 22. The lever 341 and the plate 339 thereon are selectively moved from the inoperative position of FIG. 21 to the operative position of FIG. 22 by a further depending arm 336 on lever 330. Arm 336 has a laterally outwardly open slot 337 therein, such slot slidably receiving a pivot pin 343 which is riveted at one end thereof to the laterally outer end of the lever 341. The intensity of the light reaching the single frame of the film setrip at the projecting gate is sufficiently reduced by perforated plate 339 to permit the single frame of the film to be projected for reasonable lengths of time, on the order of 10 seconds and the like, without injury to the film.

Upon release of the operating button 334, the spring 350 of switch 345 resumes its closed position, FIG. 23, at the same time thrusting arm 344 of lever 330 clockwise (FIGS. 22 and 23), to raise the lever and to lower disc 339 below the path of the light from the projecting lamp through opening 300 in plate portion 299. The motor 30 is immediately energized by the closing of switch 345, and motion picture projection of the film strip in the manner dictated by the setting of the controls of the control circuit is resumed.

*The control circuit*

The control circuit for the projector 10 and the various units thereof which have been described above is shown in FIG. 30. As there shown, the projector is provided with driving and energizing current through two main lead wires, $L_1$ and $L_2$. The projector may be powered, for example, by ordinary 117 volt alternating current. In the embodiment shown, the motor 30 is of the wound field, wound rotor type which may be reversed by reversing the relative directions of connection of the rotor and field, respectively, to the power source. A wire 354 leads from terminal $L_1$ to the three-position reversing switch 114, which is of conventional construction. A wire 355 leads from terminal $L_2$ to a terminal $F_1$ of the field of the motor 30, there being a branch wire 355' connected to wire 355 and leading to the contactor 396 of the switch 185 which, as we have seen, is operated by the loop formers through the medium of the tension-sensitive means 186 associated with the loop formers.

The terminal 395 of switch 185 is connected by a wire 362 to one terminal of a receptacle 367 mounted on the frame of the projector for powering the room illuminating lamp 43. The other terminal of receptacle 367 is connected by a wire 363 to the reversing switch 114, as shown. A wire 364 leads from the further terminal 394 of switch 185 to one side of the projection lamp 26. The other side of the projecting lamp is connected by a wire 353 to the reversing switch 114. One of the three laterally central contacts of the reversing switch 114 is connected to the second terminal $F_2$ of the field of motor 30 by wire 356; the central upper terminal is connected to a first terminal $R_1$ of the rotor of motor 30 by a wire 357. Energization of the motor 30 is completed through a wire 358 leading to a second terminal $R_2$ of the rotor of the motor through the switch 345 associated with the single framing attachment, the rheostat 359, and a wire 361 which leads to the upper right-hand terminal of the switch 114 in FIG. 30. The reversing switch 114 is shown with its three horizontally aligned movable central contacts in the "off" position. When such three movable contacts are thrown into their upper position, the motor 30 rotates in one direction; movement of such contacts into their lower position causes rotation of the motor in the opposite direction.

Wires 355 and 356 lead to the wound field of the motor, and wires 357 and 358 lead to the wound rotor thereof. It will be apparent that, when the operating knob 105 for the reversing switch 114 is in its central position, the motor 30 is de-energized and at rest, and that when the knob 105 is turned into its opposite terminal positions from its central position the motor 30 is driven in reverse directions. It is to be noted that the driving belt 102 between the pulleys 96 and 101 is crossed. Thus, in spite of the fact that the motor 30 rotates in opposite directions when the knob 105 is in its two opposite terminal positions, the take-up reel 41 and the supply reel 39 are operated in correct directions to permit the film strip to be run in opposite directions through the projector while the projector is in picture projecting operation. Such arrangement permits the projector to show motion pictures in both the forward normal manner or in the opposite reverse manner.

As shown, the projector is provided with a rheostat 359 which is mounted on a suitable bracket secured to the frame of the motor and is operated by a knob 360 on the shaft of the rheostat protruding outwardly of the flange 15 at the rear end of the frame plate 11. Such rheostat permits the projector motor to be operated at variable speed in both its forward and reverse directions. Preferably, the projector is started with the motor running at slow speed, the speed being thereafter increased as desired. The rheostat is preferably provided with a limiting stop means which is shown more particularly in FIG. 33. A rectangular plate 366 is adjustably mounted upon shaft 365 of the rheostat so as to define the permissible range of turning of such shaft between the solid line, slow speed, position thereof shown in FIG. 33, wherein a corner of the plate 366 engages the main frame plate 11, and the full speed position shown in phantom lines in such figure wherein the shaft of the rheostat has been turned somewhat more than 90° to its minimum resistance value, the rotor of the rheostat then being stopped by the normal internal stop mechanism of the rheostat.

The manner of operation of the illustrative projector and the advantages thereof will be apparent from the above. It is merely necessary, upon threading the projector, to depress the upper loop former from its open position of FIG. 9 to the closed position of FIG. 8 to prepare the projector for operation. The provision of an enlarged opening 267 in the portion 268 of the plate 266 of the lens mounting unit, through which the outwardly protruding end 187' of shaft 187 projects, not only permits the position of the loop formers to be detected by the position of end 187' of shaft 187, but permits such loop formers to be retracted manually, if desired, by tripping the end 187' of shaft 187. With the knob 105 turned to its "forward" position, the entering end of the film strip is inserted between the entrance guides 121 and 122 on the projector. Thereafter the threading of the film through the projector and its engagement by the take-up reel 41 takes place automatically in the manner above described.

The construction of the film guiding and traversing means is such that merely by opening the lens barrel mounting unit and the movable portion 315 of the member 29 there is presented a free path laterally outwardly of the projector toward the reader as the projector is shown in FIG. 3. Thus at any time the projector may be stopped and the film strip may be removed laterally therefrom without disturbing its connection to either of the reels 39 and 41.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus, for example, the projector may be arranged for projecting motion pictures in the forward direction only and also, if desired, at one fixed speed. For this purpose the motor 30 may be replaced by a unidirectional motor, the rheostat 359 may be omitted, and the switch 114 may be merely a three-position switch wherein the motor runs in the same direction when the switch is thrown into either of its two terminal positions in opposite directions from its central, "off" position, as in the above referred to patent to Herman, No. 3,074,662. For this purpose also, the belt 102 would be arranged in a straight relationship, as in such Herman patent, rather than crossed as shown herein.

What is claimed is:

1. In a motion picture projector having a support, and picture projecting apparatus on the support including a projector lamp, a projecting station including a picture positioning means disposed to guide and to subject successive portions of a film strip to projecting light from said lamp, a projector lens disposed to receive light transmitted thereto from the picture, and means for feeding the film strip through the projecting station, the improvement which comprises means providing a longitudinally divided film strip guiding channel disposed to guide the film strip with respect to the projecting station, said last named means including a first means which bears one laterally outwardly open side portion of said channel and which is fixedly mounted with respect to the support and a second means bearing a laterally outwardly closed portion of the channel, said second means being removably connected to the support so as selectively to be placed in a closed position generally parallel and close to the support and to be moved generally away from the support to an open position, and releasable means securing the second means in closed position relative to the support.

2. A motion picture projector as claimed in claim 1, wherein the film strip guiding channel is disposed following the projecting station so as to receive the film strip delivered therefrom.

3. A motion picture projector as claimed in claim 2, wherein the means bearing the laterally outwardly closed portion of the channel is formed and positioned to include at least an outer portion of a housing for the projector lamp.

4. Apparatus as claimed in claim 1, wherein the film strip has a plurality of longitudinally spaced openings therethrough, and the projecting station includes a film gate, and comprising means for feeding the film strip at constant speed into and away from the gate, said last named means comprising driven film strip-engaging sprockets disposed in alignment with the end of the channel which is adjacent thereto, the sprockets and channel being so constructed and arranged that when the channel is opened there is presented a free path laterally outwardly from the sprockets and the portion laterally outwardly open side portion of the channel.

5. Apparatus as claimed in claim 4, comprising a first film guide means disposed in advance of the film gate and a second film guide means disposed rearwardly of the film gate, each of the first and second film guide means including a first means which bears one laterally outwardly open side portion of the channel and which is fixedly mounted with respect to the support and a second means bearing a laterally outwardly closed portion of the channel, said second means being removably connected to the support so as selectively to be placed in a closed position generally parallel and close to the support and to be moved generally away from the support to an open position, and releasable means securing the second means in closed position relative to the support, the sprockets and channels of both film guide means being so constructed and arranged that when the channels are opened there are presented free paths laterally outwardly from the sprockets and the laterally outwardly open side portions of the channels of both film guide means.

6. A motion picture projector as claimed in claim 1, wherein said channel is generally centrally divided along a generally longitudinally extending plane therethrough, whereby when the said second means is moved to its open position the film strip remains supported in said laterally open side portion of said channel but a substantial width of the film strip is freely exposed at its laterally outer edge.

7. A motion picture projector as claimed in claim 1, wherein said longitudinally divided strip guiding channel is at least substantially closed when the second means is in closed position relative to the support.

8. A motion picture projector as claimed in claim 7, wherein said longitudinally divided strip guiding channel has a transverse section with opposite side edges spaced apart a distance substantially the same as the width of the film strip, the surfaces of the channel in transverse section extending between the side edges thereof being convexly curved away from the central plane between the centers of said opposite sides of the channel.

9. In a motion picture projector having a support, picture-projecting apparatus on the support including a projector lamp, a projecting station including a picture-positioning means disposed to guide and to subject successive portions of a film strip to projecting light from said lamp, a projector lens disposed to receive light transmitted thereto from the picture, and means for feeding the film strip through the projecting station, the improvement which comprises means providing a longitudinally divided film strip guiding channel disposed in advance of and a longitudinally divided film strip guiding channel disposed following the projecting station, said last named means including a first means which bears one laterally outwardly open side portion of each of said channels and which is disposed adjacent a side of the support and a second means bearing laterally outwardly closed portions of each of said channels, said second means being removably connected to the support so as selectively to be placed in a closed position generally parallel and close to the housing and to be moved generally away from the support to an open position, and releasable means securing the said second means in closed position relative to the support.

10. A motion picture projector as claimed in claim 9, comprising a projector lamp housing, and wherein a portion of the second means, bearing the laterally outwardly closed portion of each of the channels, carries at least a portion of the projector lamp housing.

11. A motion picture projector as claimed in claim 9, wherein the second means, bearing the laterally outwardly closed portion of each of the channels, is formed and positioned to include at least a part of the film strip guiding means of the projecting station and includes means for mounting the projecting lens.

12. A motion picture projector as claimed in claim 9, comprising a projector lamp housing, and wherein the second means, bearing the laterally outwardly closed portion of each of the channels, is formed in two parts, one of said parts being positioned to include at least a portion of the housing for the projector lamp, the other of said parts including at least a part of the film strip guiding means of the projecting station, and the second means further includes means for mounting the projecting lens.

References Cited

UNITED STATES PATENTS

| | | | |
|---|---|---|---|
| 2,327,776 | 8/1943 | Fairbanks et al. | 352—159 |
| 3,134,294 | 5/1964 | Kaden et al. | 352—224 |

JULIA E. COINER, *Primary Examiner.*